US008407049B2

(12) United States Patent
Cromack et al.

(10) Patent No.: US 8,407,049 B2
(45) Date of Patent: Mar. 26, 2013

(54) SYSTEMS AND METHODS FOR CONVERSATION ENHANCEMENT

(75) Inventors: Mark Cromack, Santa Ynez, CA (US); Robert Dolan, Santa Barbara, CA (US); Andreas Wittenstein, Woodacre, CA (US); David Brahm, The Woodlands, TX (US)

(73) Assignee: COGI, Inc., Santa Barbara, CA (US)

( * ) Notice: Subject to any disclaimer, the term of this patent is extended or adjusted under 35 U.S.C. 154(b) by 594 days.

(21) Appl. No.: 12/386,854

(22) Filed: Apr. 22, 2009

(65) Prior Publication Data

US 2009/0306981 A1     Dec. 10, 2009

Related U.S. Application Data

(60) Provisional application No. 61/047,163, filed on Apr. 23, 2008.

(51) Int. Cl.
*G10L 15/26*     (2006.01)

(52) U.S. Cl. ............... 704/235; 704/270; 704/7
(58) Field of Classification Search .......... 704/275, 704/270, 231, 235, 249, 254, 270.1, 7, 9, 704/251, 257
See application file for complete search history.

(56) References Cited

U.S. PATENT DOCUMENTS 7,668,721 B2 * 2/2010 Barkley et al. ............... 704/275
7,809,568 B2 * 10/2010 Acero et al. .................. 704/257

* cited by examiner

*Primary Examiner* — Huyen X. Vo
(74) *Attorney, Agent, or Firm* — Mark Rodgers

(57) ABSTRACT

This invention description details systems and methods for improving human conversations by enhancing conversation participants' ability to: —Distill out and record core ideas of conversations. —Classify and prioritize these key concepts. —Recollect commitments and issues and take appropriate action. —Analyze and uncover new insight from the linkage of these ideas with those from other conversations.

5 Claims, 19 Drawing Sheets

Portfolio View Web Page/GUI – Conversation Mode
10000

COGI™

Welcome back: Mark Cromack
MyAccount  Log out  About

[Search]

| Call | Portfolio | Contacts |

Product Launch  6/07   00:07:15

Mark Cromack

Robert Dolan (805) 957-4332

00:02:30    00:05:00    00:07:30
1 01:32

Cogi? Hint
•

Conversation Topics
Meeting, PR firm, To Do List, PR firm, Summary

Conversation Key Words
Marketing, launch, pricing
Meeting, Tuesday
Meeting, confirm, office

*English*  *Spanish*  *Japanese*  [Add Translation]

Conversation Bookmarks

| 03:23:01 PM | Meeting Time | [Bookmark Category] | Mark Cromack ☒ |
| 03:23:01 PM | Robert Dolan: | What time is the meeting next Tuesday? |
| 03:23:03 PM | Mark Cromack: | I think the meeting is at 2 PM, but I'll need to confirm that when I get back to the office. |
| {3/12/08 AM} | {Dave Brahm} | {Correction: 2:30 on the dot} |  ⟵ 12100 |
| 03:23:08 PM | Robert Dolan: | Great. That will be great! Give me a call when you get back. |
| 03:23:12 PM | Mark Cromack: | Will do. Later. |
| 03:23:12 PM | Action Item #1 | [High Priority Issues] | Mark Cromack ☒ |
| 03:23:01 PM | Mark Cromack: | Do you really think our PR firm will be able to complete the marketing collateral in time for the investment meeting? |
| 03:23:03 PM | Robert Dolan: | [Bookmark Topics] | Robert Dolan ☒ |
| 03:23:03 PM | Robert Dolan: | Brett assures me that it will be completed on time and on budget and that we'll be very pleased with the output. |
| 03:23:08 PM | Mark Cromack: | I hope so. We have a lot riding on this project. |

Fig. 12

| Contacts View Web Page/GUI 19000 | | COGI™ | | | Welcome back: Mark Cromack MyAccount Log out About Search | | |
|---|---|---|---|---|---|---|---|
| Call | Portfolio | Contacts | | | | | |
| Contacts | Home | Office | Mobile | Other | | | |
| David Brahm | +1 281 465 4035 | +1 281 292 8228 | +1 281 466 4560 | +1 281 466 4560 | edit | delete | |
| Robert Dolan | +1 805 563 4444 | +1 805 680 7000 | +1 800 555 1234 | +1 805 456-6551 | edit | delete | |
| Palmer Jackson | | +1 805 456-6550 | | | edit | delete | |
| Andreas Wittenstein | | +1-415-488-9626 | | | edit | delete | |

+ Add Contact

Fig. 19

SYSTEMS AND METHODS FOR CONVERSATION ENHANCEMENT

CROSS REFERENCE TO RELATED APPLICATIONS

This application claims priority to U.S. Provisional application Ser. No. 61/047,163, filed Apr. 23, 2008.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

FIELD OF THE INVENTION

The present invention relates to conversation enhancement, and in particular, to systems and methods for recording and retrieval of conversations and associated summarized notes.

BACKGROUND OF THE INVENTION

Problems abound from human miscommunications: e.g. people don't meet their commitments "as promised", people don't "follow directions", people "say" one thing and "do" another, people are often "stuck" making the same mistakes over and over, etc. Root causes for these problem symptoms include: —Lack of common understanding and agreement of key concepts/commitments. —Faulty memory. —Poor planning, organization, and follow through. —Weak or nonexistent improvement systems.

Attempts to reduce miscommunications due to faulty memory by recording conversations may be hampered by concern for attendee's privacy. The federal Omnibus Crime Control and Safe Streets Act of 1968, 18 U.S.C. Sec. 2510 et seq., prohibits intercepting telephone calls without the consent of the participants except under strictly controlled conditions. Some jurisdictions prohibit intercepting telephone calls without the consent of at least one of the participants. Others require consent from all participants and include face-to-face conversations in addition to telephone conversations.

This invention reduces miscommunication challenges by enhancing the conversation attendee's ability to individually and collaboratively: —Simplify: distill out and record the core ideas of conversations while preserving participant privacy. —Organize: classify and prioritize these key concepts. —Act Upon: recollect issues and take appropriate (often coordinated or interdependent) action. —Learn: analyze and uncover new insight from the linkage of these ideas with others in their conversational memory.

SUMMARY OF THE INVENTION

It is an object of the present invention to reduce the level of missed, misunderstood, and forgotten important information in conversations.

BRIEF DESCRIPTION OF THE DRAWINGS

Embodiments of the present invention will now be described with reference to the drawings summarized below. These drawings and the associated description are provided to illustrate example embodiments of the invention, not to limit the scope of the invention.

FIG. 4 illustrates an example GUI-Active Call in progress view (in English language mode).

FIG. 8 illustrates an example GUI—Active Call in progress view (in Spanish language mode).

FIGS. 11 & 12 demonstrate an example of how comments are inserted into bookmarked transcripts.

FIG. 19 illustrates an example GUI—Contacts view.

DETAILED DESCRIPTION OF THE PRESENT INVENTION

Figure 1:
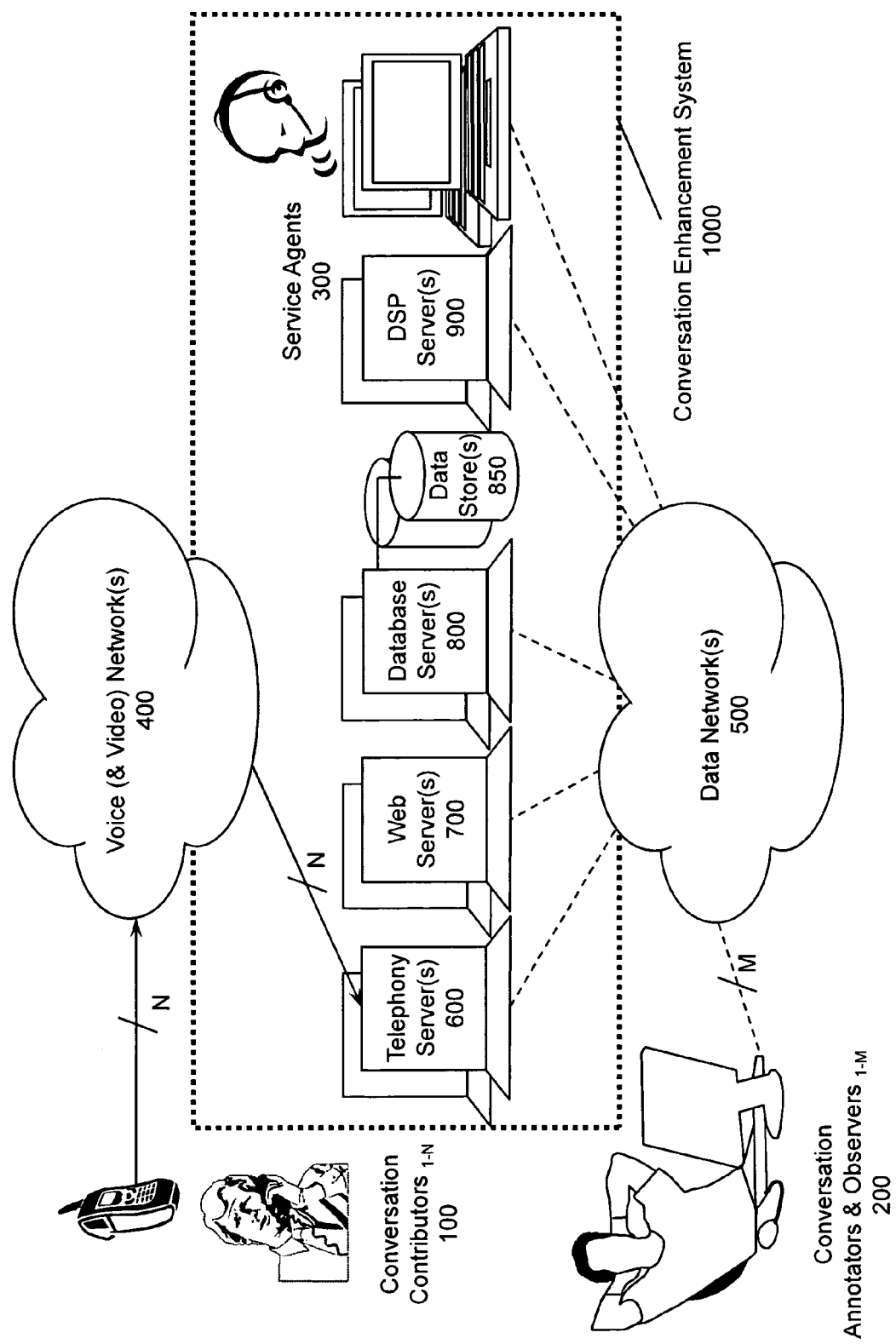
FIG. 1 is a drawing of the system architecture.

It is an object of the present invention to reduce the level of missed, misunderstood, and forgotten important information in conversations.

GLOSSARY

Conversation Enhancement System (CES)—serves to facilitate conversations among, dictation by, and/or comments between attendees through the help of service agents with access to a shared knowledge base.

CES Knowledge Base—comprises archives of ongoing and prior conversations including forums (under whose auspices the conversations are held); topics (which hierarchically group the conversations); keyword search terms facilitating finding conversations by search; individual contributions to the conversations; renderings in various languages and modalities of pieces of conversations; and highlighted bookmarks marking selected sections of interest in the conversations. The knowledge base also includes participant profiles identifying the conversation participants and recording their preferences and account information; dictionaries such as spelling dictionaries and thematic dictionaries; dynamically descriptive groups of attendees used to control access to records; access schemes dynamically controlling attendee access to the records in the knowledge base; and participant schedules relating the participant's periods of availability, scheduled conferences, and other events.

Conversations—are recorded in the knowledge base along with associated meta data including a list of conversation attendees; lists of topics, key words, and categories; bookmarked sections of the conversation and associated renderings (e.g. transcripts and translations); and annotated comments and attachments.

Conversation Attendees—in a conversation using the CES comprise subscribers and guests. Subscribers as well as guests may be Conferees permitted to participate in the conversation proper. Subscribers but not guests may be Administrators permitted to administrate the conversation and the access privileges to associated knowledge base records.

Conferees—in a conversation using the CES may be Contributors with permission to contribute to the main thread of the conversation during the actual live conference; Annotators with permission to annotate the conversation with comments during and/or after the conference; and Observers with permission to observe the live conference or view the conversation records afterwards. Contribute, annotate, and observe privileges are independent of one another. Thus a full conferee would have all three privileges, with the ability to contribute to the main thread during the live conference, annotate the conversation during or after the live conference, and observe the live conference and view the recorded conversation afterward. A mere contributor in contrast, may be called upon to contribute to a conversation without being privy to anything but that contribution. Mere observers may observe the conversation during and after the live conference, but are not permitted to actively contribute or modify any knowledge base records.

Administrators—control the conversation flow (for both scheduled as well as impromptu conference calls) including call start and stop times, conversation attendees and their associated communication device addresses (e.g. phone numbers), and conferees contribute, annotate, and observe rights. Furthermore, these privileges are dynamic. For example, at the conclusion of a live conference, an administrator may open up the conversation to permit observers to become annotators, and may choose some of those annotators' comments as contributions to the main thread of the live conference.

Service Agents—employed by the CES during a conversation may include Consultants, Operators, and/or Renderers. Service agents may be either machine assistants or human assistants.

Consultants—employed by the CES to provide expert advice, opinions, and help to the conferees including medical consultants, legal consultants, financial consultants, and many others. As with attendees, any of these consultants may be contributors to the main thread of a live conversation, annotators to the conversation, observers, or any combination thereof.

Operators—employed by the CES to coordinate communication between the attendees, the service agents and the knowledge base. Types of operators include schedulers, conversation managers, connection supervisors, command interpreters, authorizers, archivers, rendering managers, renderer managers, consultant managers, screeners, forwarders, answerers, registrars, receptionists, and others.

Renderers—employed by the CES to transform conversation contributions into alternate formats. Types of renderers include transmuters, translators/interpreters, editors, behavioral monitors, participant recognizers, and others. To render an element of a conversation into a desired target language, modality, and/or format, the rendering manager, in cooperation with the renderer manager, constructs the optimal chain of renderers given the specified time and accuracy constraints, the existing renderings of the element, and the available renderers.

Transmuters—employed by the CES to transform conversation elements between different modalities include automatic speech recognizers, human voice-writers, human scopists, and human dictation typists, all of which are termed transcribers; automatic speech synthesizers and human readers; automatic handwriting recognizers and human manuscript typists; optical character readers and human (text) typists; human sign-language interpreters; and others.

Automatic Speech-Recognizer (ASR)—is a computing system designed to transcribe speech to text without human assistance. Speech-recognizers using a pleogrammatic syntax model, in which words are recognized in the context of a fixed number of neighboring words, can operate in real time, outputting a word at a time, typically with a one-word delay. Speech-recognizers using a functional syntactical model, in which words are recognized in the context of a sentence, are more accurate than pleogrammatic systems, but although they can also operate in real time, they output a sentence at a time, with a typical delay of one sentence. In the current state of the art, automatic speech-recognizers are quite accurate at speaker-independent speech-recognition with a highly restricted vocabulary and highly restricted syntax. They are also fairly accurate at speaker-dependent speech-recognition with a large but still limited vocabulary and a general but still restricted syntax, though only for trained speakers who enunciate clearly. For typical telephone conversation, however, current automatic speech-recognizers have very poor accuracy, due to the unrestricted vocabulary, improper syntax, and poor pronunciation, as well as to telephony-specific issues such as limited bandwidth, line noise, and codec-induced signal degradation. The CES alleviates these problems without requiring explicit speech-recognizer training for each speaker, by initially relying on expert human transcribers and continually training its speech recognizers, for both speaker-dependent and speaker-independent models, on the actual speech of each speaking participant, as it is captured through the actual communication devices and over the actual networks used by the participant, and as it is transcribed by expert human transcribers. The automatic speech recognizers are only used for a particular speaker once their accuracy, as measured against the human experts' on the initial data and continuing spot-checks, attains the desired level.

Voice-writer—is a human trained to use an automatic speech-recognition system (which has conversely been trained to recognize the individual voice-writer) who listens to untrained speakers' utterances and enunciates those utterances into the speech-recognizer for transcription. To keep the utterances that they are listening to and other outside sounds from interfering with the recording of their own rendering, voice-writers typically using a stenomask or a headset with a noise-cancelling microphone. An expert voice-writer can keep up with rapid speaking rates in real time with a delay of one or a few words. However, even for the carefully enunciated speech of a skilled voice-writer, the automatic speech-recognizers on which they rely still make frequent mistakes, and still have a limited vocabulary and constrained syntax.

Dictation-typist—is a human trained to listen to speakers' utterances and type them directly into the computer system, typically into a word-processing or text-editing system. Most dictation-typists cannot keep up with average speech rates, and even the most highly skilled typists cannot keep up with rapid speech.

Scopist—is a human trained to correct the output of automatic speech-recognizers by listening to the original transcribed utterances, viewing the transcriptions, spotting any errors, and correcting them via speech input through a microphone and speech-recognizer, by hand with a keyboard and mouse, or using other computer input devices. Professional voice-writers often do their own scoping after a conference. But since voice-writing is a more demanding and higher paid skill, some voice-writers hand off their work to a separate scopist instead. The rendering manager in the CES is capable of chaining together a voice-writer with a scopist in a pipeline, such that the scopist can already begin to correct the transcription of an utterance on the fly before the voice-writer has finished dictating it, in order to keep up with rapid speech for minimal-delay real-time transcription.

Automatic translator—is a computing system designed to translate text from one language or dialect to another. Most current automatic translators are so inaccurate that human translators are usually much more efficient translating from the original than correcting the output of an automatic translator. State-of-the-art statistical translation systems can sometimes nearly match the capabilities of human translators given vast computing power and millions of training text documents of similar style and content already translated by expert human translators between the languages in question.

Human translator—is a skilled individual trained to translate text from one language or dialect to another. Human translators generally operate much more slowly than real time, but can produce very high-quality translations. Human translators must be fluent in writing the target language, but for the source language may need no more than a good dictionary and good grammar.

Interpreter—is a highly skilled human trained to translate spoken utterances in real time with little delay from one language or dialect to another. Interpreters must be fluent in understanding the source language and speaking the target language. There is as yet no machine counterpart to human interpreters, as machines are still very far from understanding or speaking any human language, never mind fluently. At best, a machine can chain together an automatic speech recognizer, a machine translator, and a speech synthesizer, compounding their errors.

Automatic Speech-Synthesizer or Text-To-Speech (TTS)—is a computing system designed to render text to speech without human assistance. Speech-synthesizers can easily operate in real time with negligible latency. However, at present their intonation is irritatingly unnatural, and their behavior in the face of new vocabulary is often peculiar. Some speech-synthesizers use the recorded speech of human speakers, and can thus sound excellent for a limited vocabulary and highly constrained syntax. Other speech-synthesizers use linguistic and acoustic models to simulate speech, and can work with unlimited vocabulary and unrestrained grammar, but sound highly artificial, especially in their intonation patterns.

Reader—is a human trained to read text out loud in a clearly enunciated style. Most humans are sufficiently literate to read text aloud in their native languages, although some have trouble with unfamiliar vocabulary. Also, since written languages generally lack intonation indicators, people typically need training to produce natural-sounding intonation when reading.

Manuscript-typist—is a human trained to read handwritten material and type it directly into the computer system, typically into a word-processing or text-editing system.

Ordinary typist—is a human trained to read printed material and type it directly into the computer system, typically into a word-processing or text-editing system. Most humans using alphabetic languages are quite skilled at typing printed text in their native languages.

Automatic handwriting recognizer—is a computing system designed to transcribe handwritten text to computer-readable text without human assistance. Some handwriting recognizers capture and recognize the actual strokes as the text is being written, providing additional information that increases the recognition accuracy. Others treat the handwriting as static shapes, much like optical character readers. Like automatic speech recognizers, handwriting recognizers work far better with highly restricted syntax and vocabulary and when trained for a particular scribe than for scribe-independent unlimited vocabulary and unrestricted syntax. The CES alleviates these problems by continually training its handwriting recognizers, for both scribe-dependent and scribe-independent models, on the actual handwriting of each writing participant as transcribed by expert human manuscript typists, only switching to automatic handwriting recognizers once their accuracy has reached the desired level.

Optical character reader—is a computing system designed to transcribe printed text to computer-readable text without human assistance. Provided that the text is clearly printed in high contrast on a solid-color background, current optical character readers have excellent accuracy.

Sign-language interpreter—is a human trained to transmute spoken language into gestural language or vice versa. Note that, generally speaking, sign-language interpreters not only transmute the modality, but also translate the language, since the grammar and vocabulary of most sign languages are quite distinct from those of any spoken languages. Sign-language interpreters must be fluent in understanding the source language and speaking or signing the target language. As yet human sign-language interpreters have no machine counterpart.

Editors—employed by the CES to review conversation elements and their renderings to distill particular types of information. Editor types include automatic and human dictation editors; automatic text editors; human proofreaders; summarizers; outliners; thematic filters; search aids; and others.

Dictation-editor—is a machine designed or human trained to read verbatim transcripts of conversations and dictations and clean up hems and haws, repetitions, and other fillers; stutters, false starts, unintentional spoonerisms, and other speech errors, without editing anything that might alter the intended meaning or style. Although in prior art, most types of dictation editing have always been done by humans, in the CES most of these are automated.

Automatic text editor—is a machine designed to detect and clean up misspellings, grammatical mistakes, and other typographical errors, without editing anything that might alter the intended meaning or style. In the state of the art, automatic text editors have no understanding of the text and are unable to learn on their own, and are thus highly prone to miscorrections in the face of unfamiliar vocabulary, forms, and constructions.

Proofreader—is a human trained to read text and clean up misspellings, grammatical mistakes, and other typographical errors, without editing anything that might alter the intended meaning or style. Because humans have a deep understanding of their native languages and the content they read, they often overlook obvious errors that are inconsistent with their expectations, so proofreading is a skill that requires special training to pay attention to superficial details.

Summarizer—condenses a conversation into a coherent abstract capturing the salient points of the conversation. Summarization entails a profound understanding of the conversation in the context of other content in that field and can currently only be done by humans.

Outliner—detects changes of topics and subtopics in a conversation and extracts these into a rough outline of the content. Outlining is particularly difficult in unstructured conversation, where conferees typically bounce back and forth between different topics. In prior art, outlining has always been done by humans, but outlining conversations, which tend to be long and sparse in content, is exceedingly tedious work. In the CES, this process is automated by analyzing the lexical statistics of the conversation.

Thematic filters—are a novel concept that distills out keywords and topics of a conversation corresponding to desired themes according to the type of information the observer is trying to extract from the conversation. In business conversations, for example, observers generally have fairly well-defined roles such as research & development, marketing, sales, operations, customer care, finance, quality control, human resources, administration, and management. In each of these roles an observer would accordingly be interested in extracting very different types of information from the same conversation. The CES provides thematic filtering with the aid of personalizable thematic dictionaries, for predefined themes such as those associated with the aforementioned business roles, as well as for custom themes, by highlighting only keywords and topics of the conversation containing terms in the appropriate thematic dictionaries.

Search aid—lets the user search conversations and other records according to various criteria such as specific keyword search terms, topics, forums, contributors, dates, record types, languages, modalities, formats, and categories. Search aids are well studied in prior art in the field of document retrieval, but the CES provides some novel tools such as user-defined orthogonal and hierarchical categories.

Behavioral Monitors—audits of conversational elements to facilitate conferee self-improvement, teaching, and other purposes, including speech monitors measuring the prevalence of such potentially irritating speech habits as hems and haws, stutters, throat clearing, tsking, lip-smacking, nervous laughter, snorting, and other vocal tics; pronunciation monitors measuring the prevalence of pronunciation habits interfering with intelligibility, such as mumbling, shouting, slurring, mispronunciation, monotony, croaking, squeaking, whistling, breathing into the microphone; grammar monitors measuring the prevalence of unorthodox morphology and syntax; style monitors measuring the prevalence of stylistic habits such as repetitions, cussing, meaningless fillers, false starts, and overuse of words, phrases, and syntactic structures; discourse monitors measuring the prevalence of such habits as hogging a conversation, wandering off-topic, interrupting, contradicting, disparaging, and unresponsiveness.

Participant Recognizers—that the CES may use to identify participants include address recognizers to identify participants by their telephone number, IP address, or other contact information; name recognizers to identify them by their names as introduced and addressed during the conversation; login recognizers to identify them by their login names and passwords; speaker recognizers to identify them by their voices; scribe recognizers to identify them by their handwriting; face recognizers to recognize them by their faces; and others, such as other biometric and ethometric characteristics.

Communications devices—used by conversation attendees and human service agents to communicate with the CES and each other via appropriate network attachment include mobile phones; land line telephones; videophones; audio conferencing units; personal computers; portable computers; telebraille machines; textphones; fax machines; optionally interactive television sets; and pagers. Any of these communications devices may serve as input devices for any human participants to communicate to the CES, and/or as output devices for the CES to communicate to any human participants. In addition, any of these devices may be either ordinary unenhanced communication devices, or communication devices specially enhanced to take advantage of CES features. As new communication devices are developed, the CES may be easily adapted to handle them, and they may likewise be enhanced to take advantage of CES features.

Networks—that participants may use to communicate with or within the CES, including public switched telephone networks, the Internet, cellular telephone networks, satellite networks, cable networks, dedicated wide-area networks, local-area networks, digital buses within a computer system, and any other suitable communication networks. Any of these networks may in principle be used with any type of communication device. As new network technologies are developed, those too may be easily incorporated into the CES.

The functionality, operation, and implementation for an example Conversation Enhancement System will now be described in further detail.

FIG. 1 depicts the functional elements of the Conversation Enhancement System (CES) 1000. Conversation Contributors 100 (e.g. speakers), Conversation Annotators & Observers 200, and Service Agents 300 (humans and/or machines), interact with each other before, during and after a live conversation using the CES 1000. The system 1000 interfaces with voice networks 400 and data networks 500, for example, the Public Switched Telephone Network (PSTN) for voice and the public Internet for data. When handling digitized speech, the two logical networks can be converged onto a single physical medium. The CES 1000 is comprised of one or more Telephony Servers 600, Web Servers 700, Database Servers 800, and Digital Signal Processing (DSP) Servers 900. Physical servers can also be shared by running multiple logical processes on a single server. For example, a small service provider can run all CES processes on one server. In another example, a system handling many simultaneous users can require several instances of each of the four types of servers 600-900.

The CES 1000 is implemented using a client-server architecture. A thin client (like an Internet browser plug-in) running on a Personal Computer or on a data-enabled wireless phone provides a Graphical User Interface to support conversation observers & annotators 200 and service agents 300. In this example, the user interaction is controlled by one or more web servers hosting the subscriber GUI user agent host software and the live operator service agent GUI user agent host software. At the other extreme, native (fat) client software running on the respective subscriber and live agent terminals can obviate the need for the Web Servers to host these GUI applications. Software running in the Telephony Servers hosts the Telephone User Interface (TUI) user agent for people accessing the service using a telephone. This includes participants in the live conversation (i.e. contributors 100), as well as conversation annotators & observers 200 who can access the system at any time. Additionally, a single individual can have contribute, annotate, or observe access privileges or any combination of the three capabilities.

In all cases, the Web Servers 700 also host the server side application software providing overall control of the service. Service is initiated by the subscriber TUI and/or GUI clients logging in to the server application. The subscriber then initiates managed telephone calls, examines and modifies live and previously recorded conversational audio and metadata fields, and manipulates entries in their contacts list.

The server application coordinates lower level activities that it delegates to subordinate server software modules. These modules can run on the same server or on separate servers. For example, Telephony services could be handled by independent Telephony Servers 600 and DSP Servers 900.

These capabilities include call setup and teardown, user audio input/output handling including conference bridge mixing, audio prompt play-out, tone detection and generation, and conversion of text-to-speech and speech-to-text (automatic speech recognition). In an analogous manner, the server application oversees all access to the various media and metadata records that are stored in the application database managed by the Database Servers 800. Again, the database server software can be hosted on one or more remote servers or be co-resident with the web server application.

Of special note is the implementation of separation and identification of different speakers. When connecting on different physical phone lines, this is trivially implemented in the Telephony Server. Speaker identification is facilitated by storing subscribers' and their frequent contacts' unique voiceprint parameters along with their telephone numbers in the database. Multiple speakers sharing a common audio input connection (e.g. when using a speaker phone in a conference room or when recording a face-to-face conversation using a hand held device) requires digital signal processing algorithms running in either the Telephony subsystem or in the service agent DSP Servers 900 to discriminate between speakers. This is accomplished by analyzing the structure of the speech waveform (e.g. analyzing the formants, pitch, pace, loudness, dynamic range, pauses, vocabulary used, etc).

Automatic speaker identification accuracy is facilitated by storing subscribers' and their frequent contacts' unique voiceprint parameters in the database. Detection of a new speaker but without sufficient discrimination quality to identify exactly which call participant was speaking is flagged in the transcript. This entry can then be corrected by the subscriber at a later time. Upon correction, the system then reruns the analysis to improve the stored voiceprint parameters to improve future speaker identification accuracy. In an analogous fashion, should the system misidentify the speaker, the subscriber can similarly correct it and the service then automatically retrains the associated voiceprint parameters. In a different embodiment of the solution, speaker separation and identification can be performed by live service agents during transcription, translation, and/or scoping. In yet another embodiment, machines and humans work cooperatively to perform the service agent functions.

Lastly, the server application requests assistance from service agents 300 from time to time. Service agent capabilities include, but are not limited to: —Conversation key phrase recognition; —Transcription and scoping (i.e. spelling and grammar checking); and —Language translation services. These functions can be provided in real time, non-real time, or near-real time with the server application managing the corresponding GUI displays appropriately. These services can be provided by live agents, machines, or a combination of the two. Agents may receive one or more speaker audio segments for direct processing or may receive preprocessed information from other agents.

Figure 2:
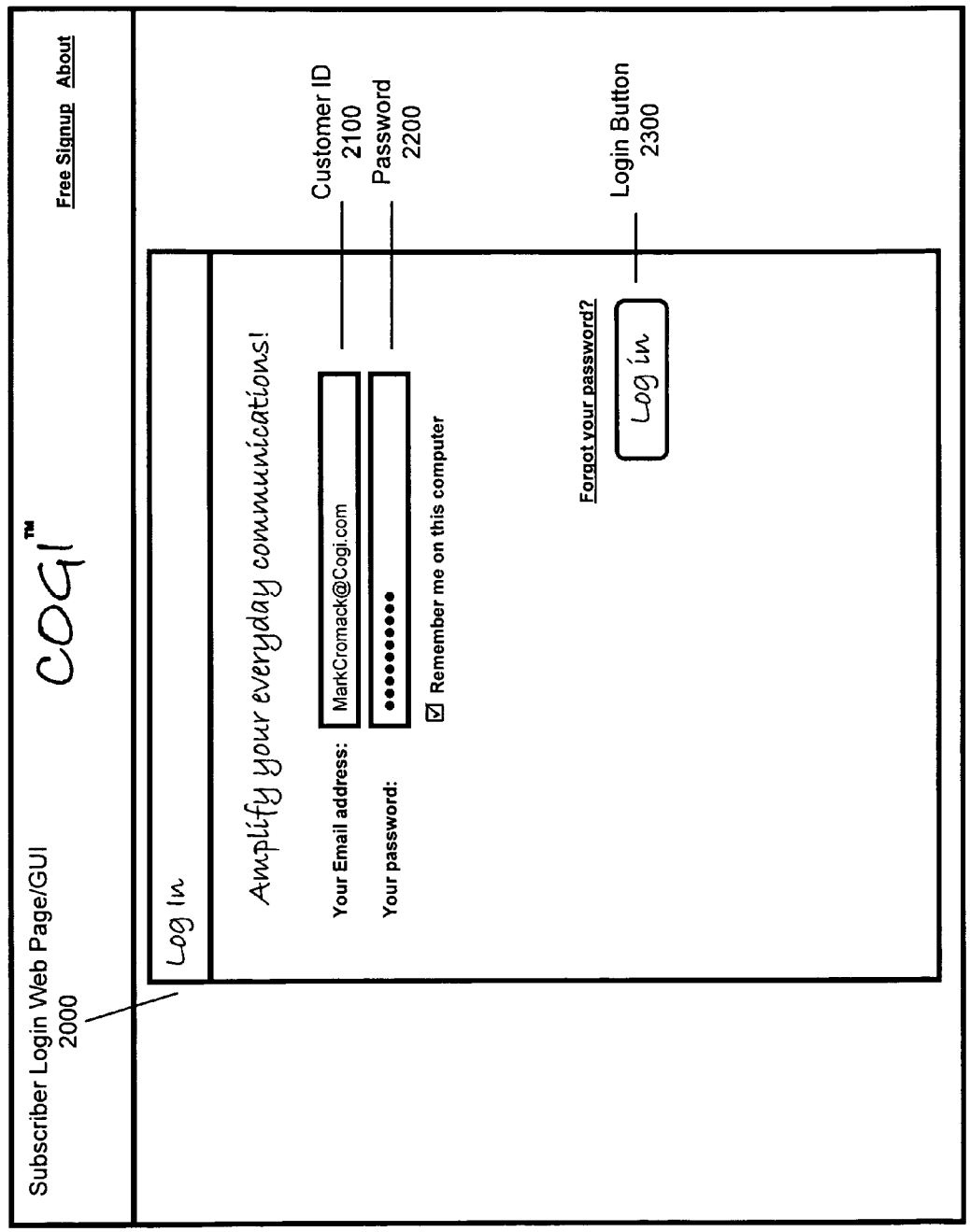
FIG. 2 illustrates an example Graphical User Interface (GUI)—subscriber Login view.

An example subscription communications service using a CES 1000 is next described. The service permits subscribers to:

Log in to the service using a standard web browser (like Internet Explorer, Firefox, or Safari) or using native client software running on the subscriber's computer (see FIG. 2).

The subscriber accesses the Login Web Page/GUI 2000, enters their unique customer ID 2100 (in this example we use their Email address) and their password 2200 and then clicks the Login Button 2300.

Additionally, a simplified version of the service is provided for telephone only access. The subscriber logs into the service by calling a pilot number or by calling a virtual phone number uniquely assigned to the subscriber. The subscriber login and password can be manually entered using DTMF keys or via spoken commands. Alternatively, the incoming call's caller ID is used to uniquely identify the subscriber and auto logs in to the service. The subscriber then enters their password to activate the service. Additionally, an application can be downloaded onto the subscriber's smart phone which customizes the auto log in process.

Figure 3:
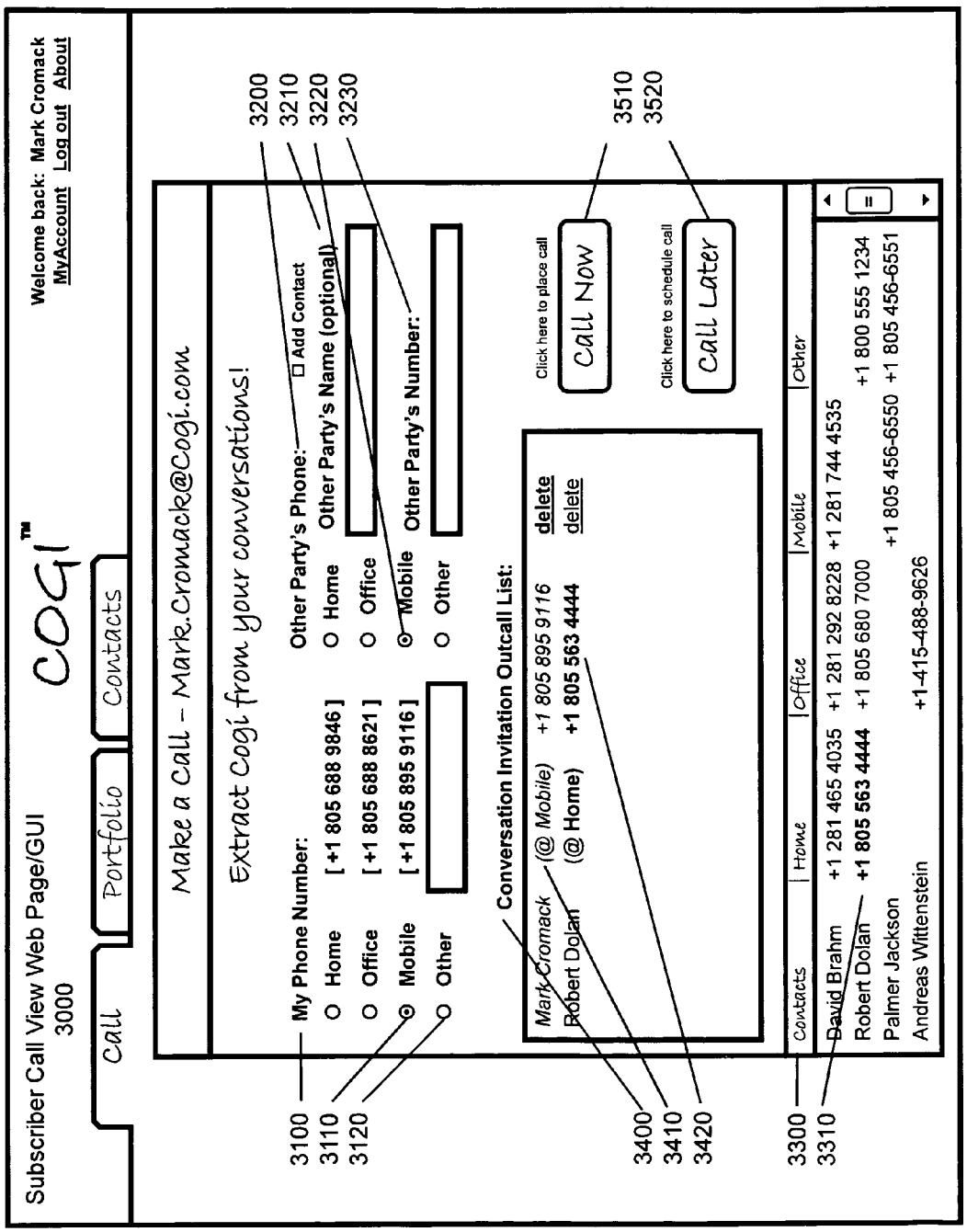
FIG. 3 illustrates an example GUI—Call Placement view.

Initiate managed telephone Calls to one or more other participants who may or may not also be subscribers to the same service (see FIG. 3—Subscriber Call View Web Page/GUI 3000).

The initial administrator of the conversation creates a list of subscribers and guests to invite to participate in the live call. The administrator's selected phone number 3110 is automatically populated in the call list 3400 as the first line item 3410. The last number used by the administrator is remembered by the CES 1000 and displayed as the default initial selection. The administrator can make an alternate selection from their list of phone numbers 3100 including the ability to select a number 3120 other than their recorded Home, Office, and Mobile numbers. The administrator next selects others to invite to participate 3420 by selecting entries 3310 from their contact list 3300 or by manually entering caller information in the Other Party's Phone field 3200. Manually entered data must include the Other Party's phone Number 3230 and can optionally also include the phone type 3220 and Other Party's Name 3210 specifications. Lastly, the administrator schedules the call to be initiated at a later time by depressing the Call Later button 3520 or begins the call immediately by depressing the Call Now button 3510.

Figure 4:
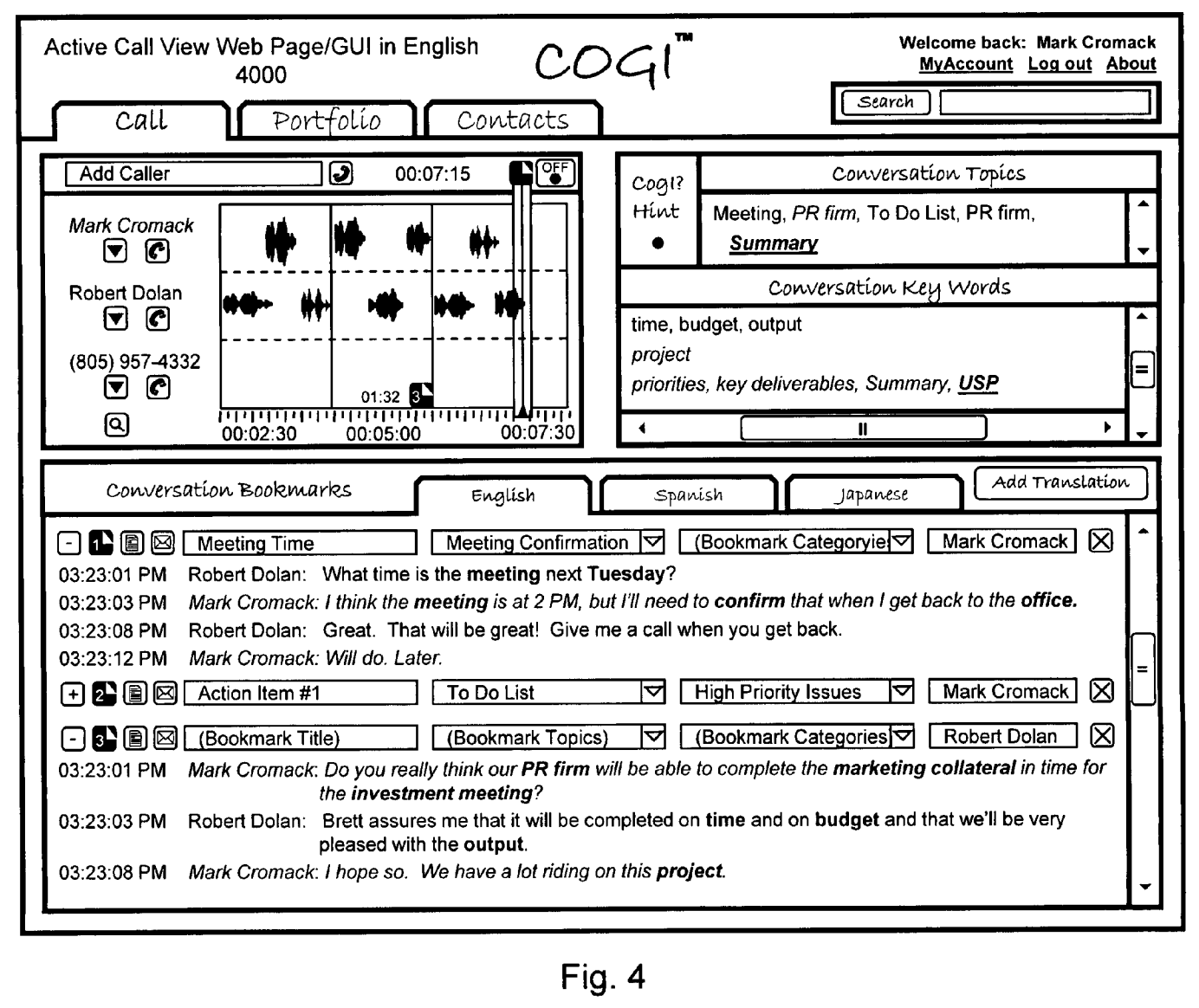
Figure 6:
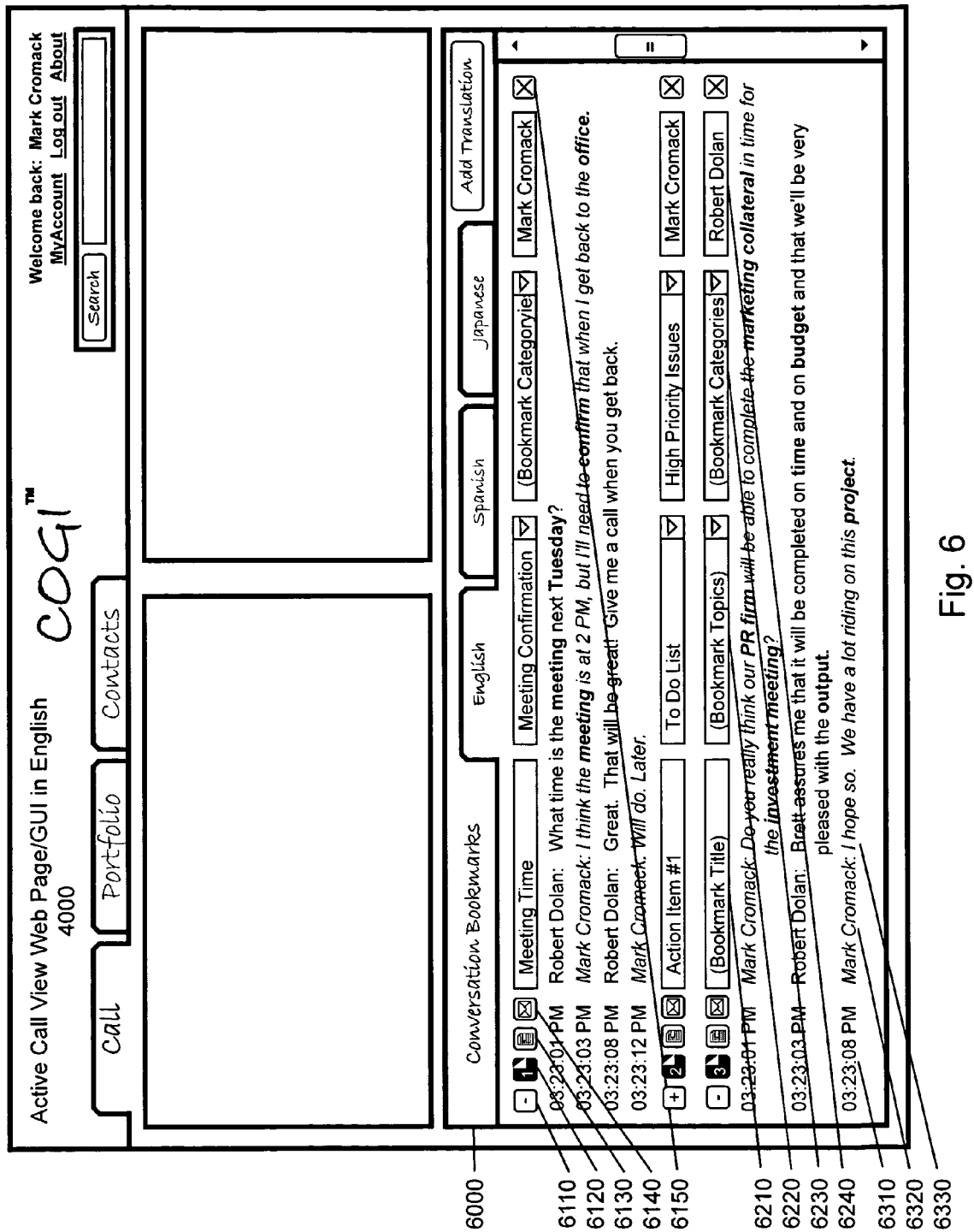
FIG. 6 expands the GUI—Active Call in progress view by detailing the conversation bookmark pane and associated controls.
Figure 7:
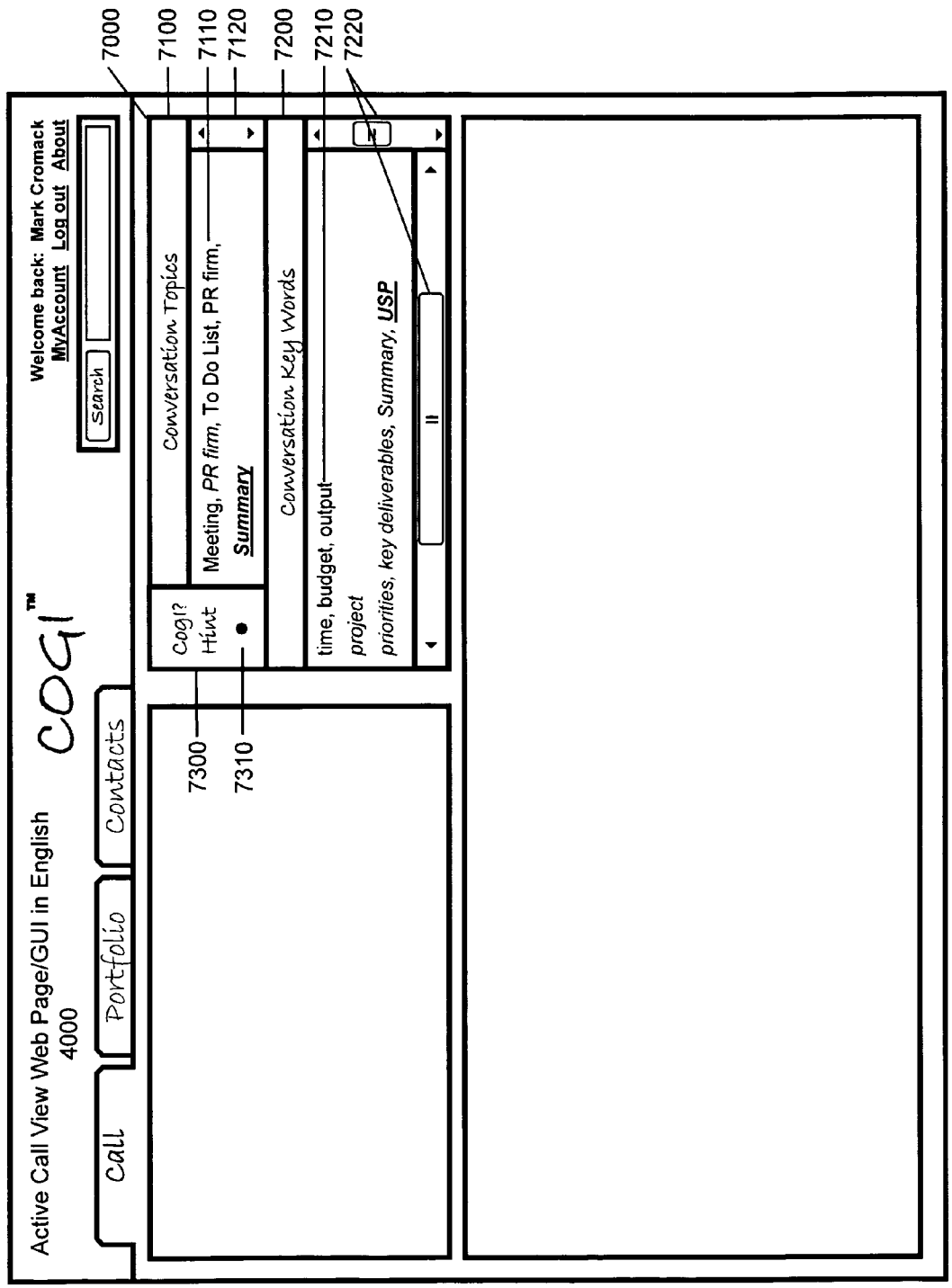
FIG. 7 expands the GUI—Active Call in progress view by detailing the Audio, CogI, and Topics panes.

Upon successful completion of the call setup process, the CES 1000 advances the Web Page/GUI to the Active Call state (4000—see FIG. 4). When in this mode, the GUI displays three panes of information: the Call Control pane (5000—see FIG. 5), the Conversation Bookmarks pane (6000—see FIG. 6), and the Key Words and Topics pane (7000—see FIG. 7).

Administrators can drop participants (conferees and consultants) from the call and invite additional participants to join the conversation at any time during the call using the hang-up button 5230 and the Add Caller controls 5110 and 5120 respectively. Active call participants are listed 5210 along with a visualization of their associated speech utterances on a timeline display 5320. The time scale can be changed using a zoom-in/zoom-out button 5310 in the call control pane 5000. A running count of the call duration is displayed 5430 and the current recording point in time is visually indicated on the speech waveform display by a cursor 5440.

Additionally, subscribers logging in via telephone invite others to join the conversation by use of DTMF and/or spoken commands. The subscriber who initiated the call can choose to drop off from the live call by simply hanging their phone up. They can then continue to observe the activity from their GUI or even allow the call to run to completion unattended. In a similar way, other subscribers can accept the invitation to join the live call and speak with the other call participants, monitor the conversation and/or record offline comments/annotations from their GUI and/or their phone, or any combinations of the above.

Protect the Privacy of their Contact's Conversations.

Several alternative schemes are offered to allow the subscriber to customize their callers' treatment. For example, calls to participants residing in areas requiring consent of all parties for conversation recording result in a system prompt notifying them that the service is monitoring and logging the call. Each called party then is asked if they will allow recording their portion of the call. The called party must explicitly allow or disallow recording to enter the call. This can be accomplished using DTMF or spoken commands. If recording consent is denied, the person is informed that their portion of the call will not be recorded but that other participants' portions will. They are prompted to acknowledge that they understand and accept these conditions. If they do not respond affirmatively, the call completes with a polite good bye and the initiating subscriber is informed of the call rejection. Alternatively, upon receipt of a positive second acknowledgement, their entry 5210 in the Call Attendees list in the GUI Active Call view is flagged to alert the subscriber that this participant is actively connected into the live call but their speech utterances are not being recorded. If the individual granted their consent and their contact information is logged in the contact list, they are subsequently asked if they will grant permission for recording all future calls from this subscriber. Using an alternate scheme, the subscriber can configure their service to not request a second acknowledgement and to proceed without call recording and transcription services in this situation. In another embodiment, the responsibility for managing recording consent is delegated to the initiating subscriber. In this case the service does not provide any means of securing and enforcing consent.

Accommodate Multiple Participants Sharing a Common Telephone Line.

Examples include use of a speaker phone or multiple home or office party line extensions. The service detects multiple speakers using speaker identification digital signal processing algorithms. Upon detection of a new speaker, the system creates a new attendee list entry labeled "New Speaker <number>". The subscriber can optionally rename the entry name or leave it as is. The single physical phone connection is logically partitioned into multiple virtual phone connections; one per speaker. The virtual speaker audio streams are serviced as if they were physically separate phone connections. Separated audio streams can be processed by different service agents for key phrase spotting and transcription services, each of which can be optimized to the unique characteristics of the individual speaker and agent. For example, the quality level of computer automated speech recognition is dramatically improved when the recognizer has been trained to service a single speaker.

Replay a Previously Recorded Segment of Audio to all Participants During the Live Call.

While replaying, the service can be configured to alter the play-back of the previously recorded signal to alert the listeners. For example, the amplitude or pitch of the signal can be modified slightly. Any of the participants can speak during the audio recording replay and the two or more signals are combined so that everyone hears the "same" mixed audio stream (for example using well known state of the art audio conference bridge algorithms). The mixed stream, including the previous pitch modified recording, is rerecorded in the current conversation audio log as it occurs in real time. The subscriber can select the segment of audio to be replayed from any bookmarked CogI (the inventors' trade-name for marked or selected portions of the conversation along with related data), key word, or topic in this call or any previous conversation recorded in the subscriber's portfolio. If no CogI, key word, or topic has been selected, the system replays the last portion of speech in the current live call stream. Rapidly tapping the replay button (see FIG. 5—item 5220) multiple times causes the replay cursor to rewind a corresponding multiple number of times. The simple telephony only interface supports replay of only the most recent live conversation. DTMF and/or spoken commands control the functionality. Another variant on this feature is the option of allowing subscribers to replay previous recordings that only they hear. This is accomplished by right mouse clicking (versus standardly left mouse clicking) the replay button 5220 and selecting from a list of advanced call control services. The CES 1000 attenuates the audio signal of the "other" participants live conversation to make the replay audio stand out.

Identify the Name of Conversation Speakers.

The CES 1000 user interface identifies contribution authors, conversation participants, and forum members primarily by name and/or phone number. In the graphical user interface, each contribution is labeled with the author's name, as is customary in theatrical scripts, on-line forums, and chat sessions. Moreover, the telephone user interface provides a convenient mechanism to hear the name of the current contributor by attenuating the live conversation play out and "whispering" the speaker's name superimposed over the top of it. The subscriber can configure their service to automatically announce each new speaker or to only do so only upon receipt of a specific user gesture (e.g. a DTMF key press).

Figure 5:
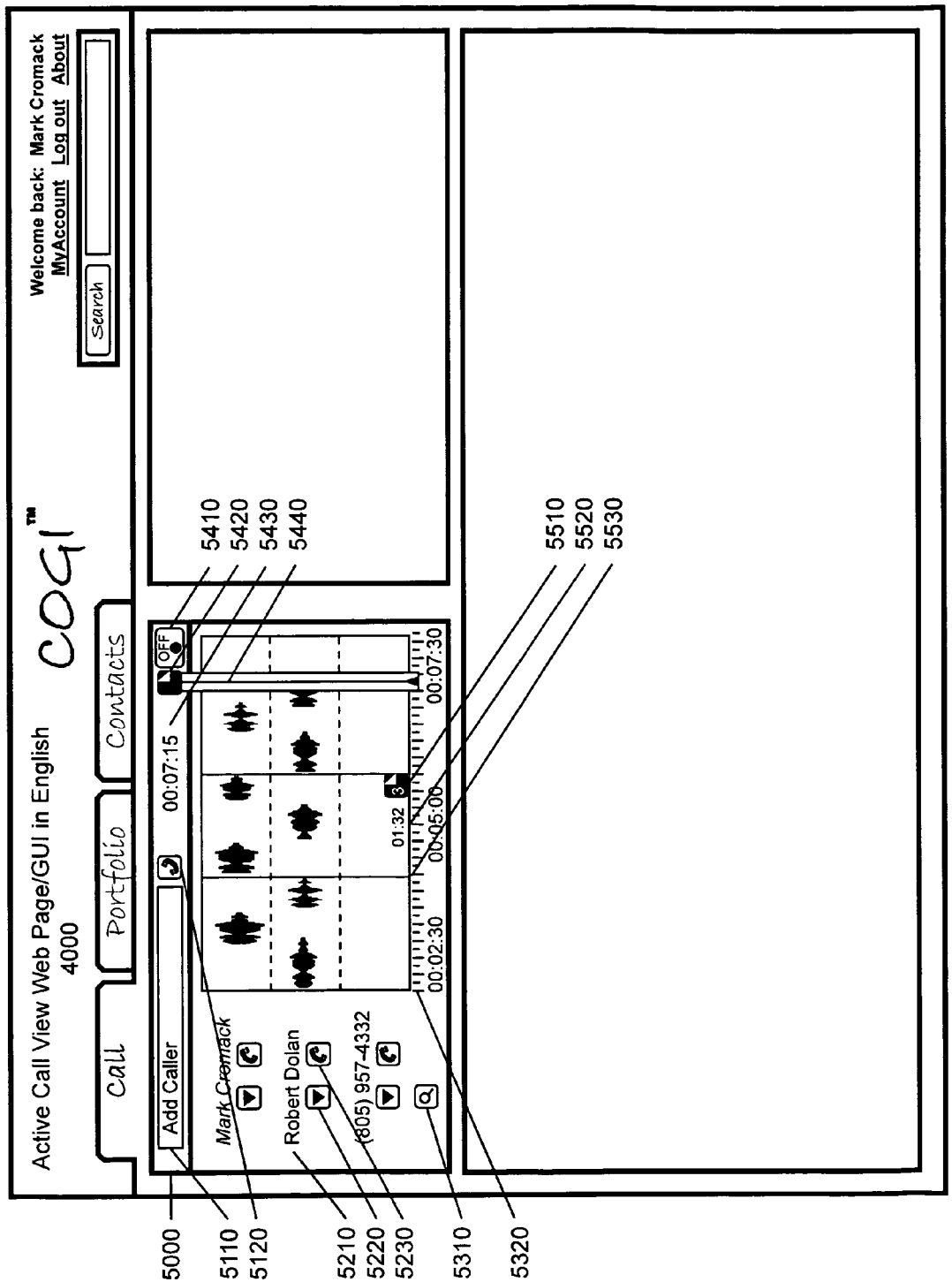
FIG. 5 expands the GUI—Active Call in progress view by detailing the call control and status pane.

Flag a Portion of the Conversation as being Off the Record by Using the Record Off Button (see FIG. 5—item 5410). This causes this button to toggle to the Record On state, allowing the subscriber to resume recording by a subsequent button press. While in the suspended recording state, a warning light on the button is illuminated and the audio log is suppressed. For example, superimposing a bleep tone (or, perhaps a very soft tone that is nice to listen to) or an audio prompt stating the next passage is "off the record" in the audio recording drowns out the recorded conversation. Additionally, a bookmarked CogI is created to bookmark the beginning and ending of the bleeped recording. This permits future playback of the conversation to fast forward past this section. Transcription of off-the-record conversational segments is disabled.

Bookmark Segments of the Ensuing Conversation as Core Concepts

These concepts are herein called. COGent Ideas referred to as CogI as described above, that can be replayed later, both during and after the live call (see FIG. 6-A*ctive* Call View Web Page/GUI with Bookmark pane detail 6000). Additionally, CogI can include a textual note 6330 to assist human and machine information processing. These notes can be manually entered as a comment by the subscriber at any time or transcribed by the service and populated in the notes field. Transcription services strip filler words like "um" and "uh" unless explicitly configured in the subscriber's preferences to not do so. The subscriber can request that the system transcribe the notes at any time. For example, when identifying a CogI, the subscriber can create a bookmarked entry either with a transcript (by left mouse clicking the CogI button 5420) or without a transcript (by right mouse clicking the CogI button 5420). If a CogI w/o notes was initially created, the user may subsequently request that the service transcribe a note from the audio recording by clicking the Transcribe button 6130 located next to the CogI label title 6210 (see Icon description below). The system could separate the comments/notes and transcription fields (which is the situation in the example Figures) or manage them as a single record. When using a merged field scheme, the service created transcript is prepended in front of any manually created notes in the shared Notes field. Subscribers logging in via telephone can bookmark CogI using DTMF and/or spoken key words but cannot request transcription services.

The bookmark records a starting and stopping time in the audio stream to highlight the desired important passages in the conversation. The service creates default values for these fields which the user can modify as desired. For example, initial defaults of plus and minus 15 seconds relative to the time of the user GUI gesture are used until sufficient user behavior is available to dynamically adapt the times based on past history. The user can then modify the highlighted audio by dragging the CogI start cursor 5530 and/or CogI end cursor 5510 to the desired time settings on the speech waveform display. The CES 1000 displays the duration of the CogI 5520 to aid the in this process.

When the transcription service agent is unable to keep up, selected audio segments of words or clauses are dropped (e.g. drop "very" from "very old" or drop "As you know"). When an utterance is unrecognizable, the agent puts a place holder for the "missing" audio in the transcript. Transcription errors and omissions can be manually corrected at any time by the subscriber. Upon correction, the system then reruns them to improve the transcriber parameters thereby improving future transcription quality.

Examine and Modify CogI by Use of GUI Controls.

A single CogI is selected by using the Auto Play button 6120 and/or the Minimize[−]/Maximize[+] control 6110. The CogI Notes List is suppressed when Minimized by the subscriber. While minimized, the control button 6110 changes state to the Maximize mode [+]. Depressing the Maximize button causes the CogI Notes field to be displayed and the icon to return to the Minimize state [−]. In a similar fashion, the subscriber can delete a CogI at any time by using the Delete button 6150. An Undo capability is provided in a pull down menu using a right mouse click to reverse the previous Delete and restore the CogI. The subscriber can forward an EMail to other subscribers and guests with a link to the contents of a CogI using the EMail button 6140. Lastly, a button is provided to allow the subscriber to request that the CogI be transcribed 6130. This button is greyed out when the CogI audio has already been transcribed. The service includes a method to allow the subscriber to edit the transcriptions (e.g. to correct errors) and a method to subsequently restore the transcription to its original unedited content. Additionally, alternative views of the same transcript (original and edited versions) are supported.

Manually Enter CogI Metadata Fields

Label 6210, Select a topic name 6220, and categorize 6230 the bookmarked information assist in future searching and sorting operations. Additionally, the system automatically records metadata logging the CogI author 6240, timestamp 6310 and initial speaker name 6320 for synchronization with the start of the CogI audio stream. When automatic note field transcription has been invoked, the system displays a new timestamp 6310 and speaker name 6320 in addition to the transcribed note 6330 corresponding to the spoken conversation at each transition in speakers. When multiple speakers are simultaneously speaking, the transcription service separates the independent threads of conversation on separate lines with corresponding starting time stamps and speaker names. Speech from participants who have denied recording consent is shown with an appropriate time & date stamped line with default CogI Label and Note fields indicating Recording Consent Denied. Observers can annotate these fields at any time to record their comments about the conversation. Audio for this speech segment is suppressed.

Observe Important Words in the Live Conversation Detected and Highlighted by the Service.

(see FIG. 7—Conversation Topics and Key Words pane 7000) Detected key words are scrolled across the marquee display 7200 as they are detected. Additionally the service displays a visual indicator of the significance score 7300 for each key word phrase to assist the user in identifying portions of the conversation to be bookmarked as new CogIs. The key word is cross correlated with previous relevant conversations and CogIs logged in the subscriber's conversation portfolio that have common or similar key phrases in their text and/or metadata fields. Additionally, the subscribers can search and examine the portfolio entries for these identified relevant conversations during and after the live call.

The key phrase significance score can also include an analysis of the emotional tone of this portion of the conversation as another hint that this is or is not a CogI. This analysis includes changes in volume, pitch, cadence, etc. Selected key phrases are given special weighting. For example, the key phrase "interesting" when expressed with an increase in emotional exuberance will rank higher.

In another embodiment (the one depicted in FIGS. 4-7), the significance score is reduced to a binary value. The service hints to the observer that this portion of the conversation may be significant by mixing an audible signal into the audio output and/or by a visual indicator 7310 in the GUI. When operated in this mode, the service optionally suppresses the recording and/or display of the text of the key words and topics. This is especially useful when the missed word error rate of the automatic speech recognition algorithm might cause user dissatisfaction.

The significance scores of the key words and topics are analyzed to recommend default conversation and CogI label titles 6210 and topic 6220 entries. The user can accept the default value, leave the entry unused (blank), or create their own entry.

Observe the Stream of Conversational Topics 7100 Distilled Out of the Spotted Key Words by the CES 1000.

System detected topics and topic transitions in the conversation serve as an additional aid to sensing significant portions of a conversation.

Figure 8:
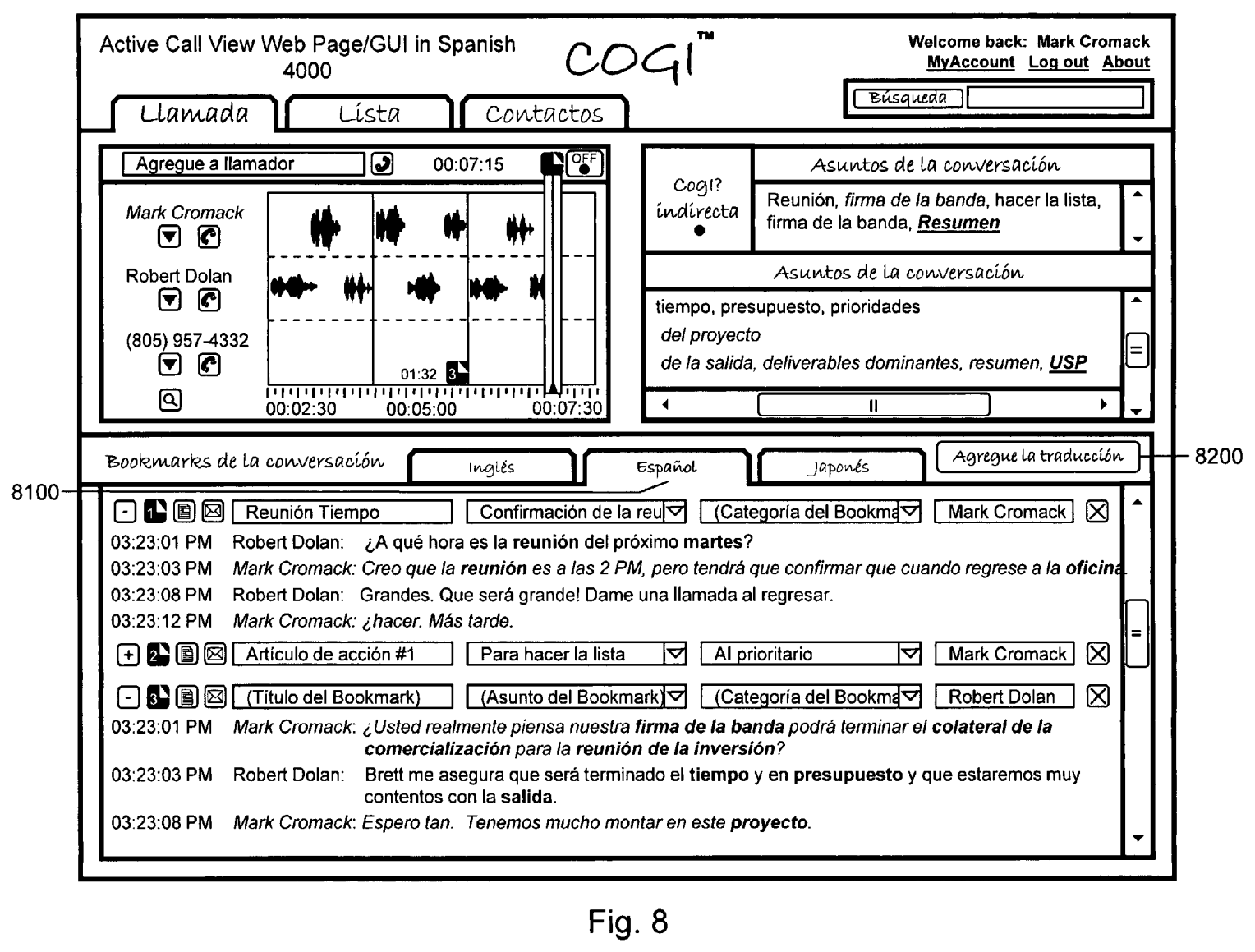

Request that the System Automatically Translate the Conversation Metadata into Alternative Languages (see FIG. 8). Multiple languages are simultaneously supported, and the user may switch between alternative views of the same conversation in different languages by selecting alternate tabbed bookmark/CogI entries 8100. An Add Translation button 8200 serves to allow the subscriber to request that a new language view be created. Alternatively, the subscriber's preferences can be configured to always provide certain translated views. Additionally, different classes of services can be similarly configured in the subscriber's preferences specification: e.g. to support special purpose language extensions like extended vocabularies for legal and medical applications.

Figure 9:
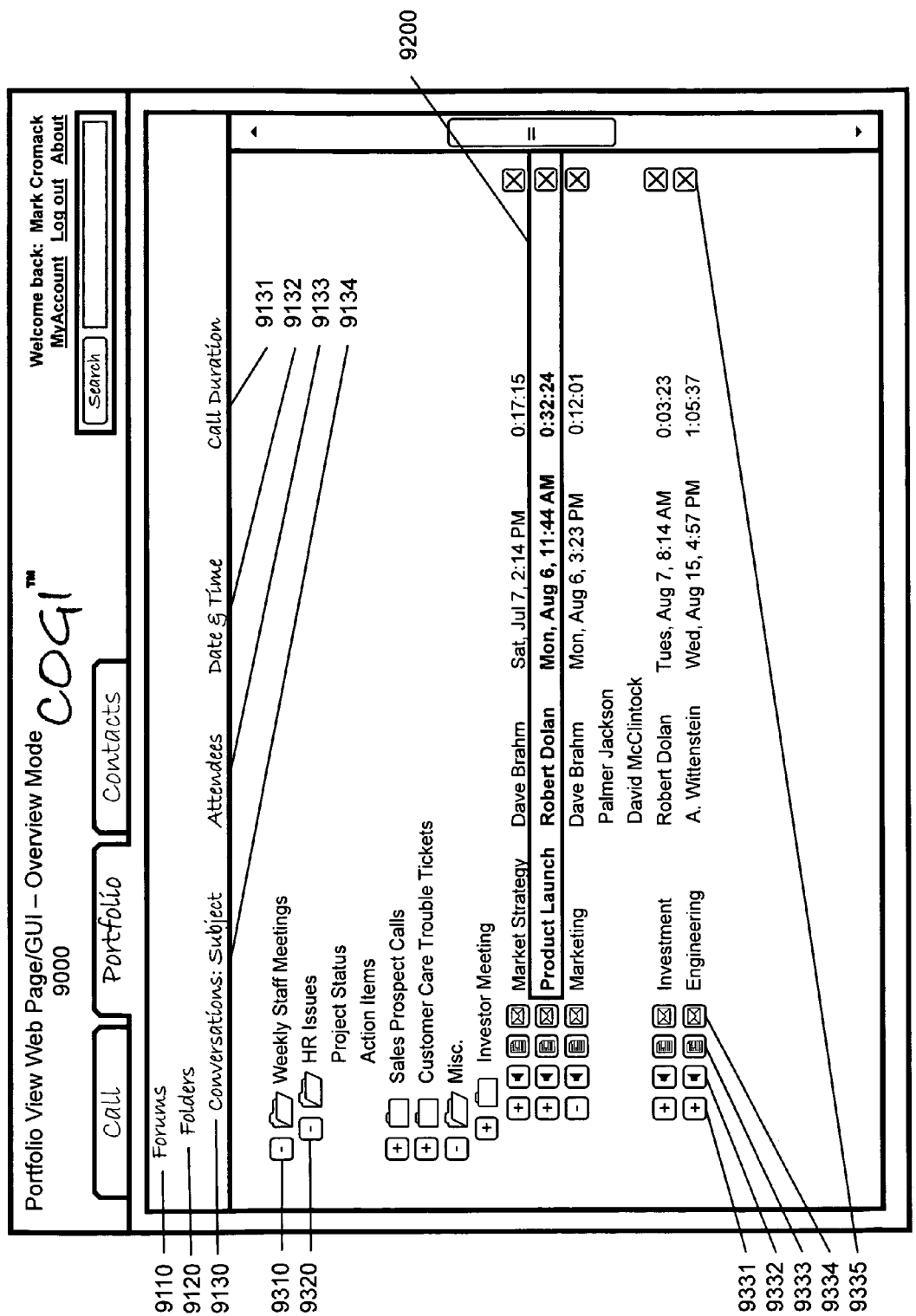
FIG. 9 illustrates an example GUI—conversation Portfolio in Overview mode.

Review Previous Conversations (see FIG. 9—Portfolio View Web Page/GUI—Overview Mode). A summary of conversation metadata is provided. Conversations 9130 are stored in a nested directory structure of Forums 9110 and Folders 9120, analogous to EMail inboxes and folders. Controls are provided to open and close the Forum display 9310 and the nested Folder display 9320 . . . . The conversation summary 9130 lists conversation subjects 9134, attendees 9133, date & time 9132, and duration 9131 for each entry. The list can be resorted on any of the four columns (in both ascending and descending order). A cursor 9200 displays the currently selected active conversation. Icons are provided to examine and modify conversation list entries analogous to controlling bookmarked CogI list entries. A single conversation is selected by the Minimize[−]/Maximize[+] Icon 9331 or the Play Icon 9332. All but the first entry in the participants list is suppressed when Minimized by the user. Additionally, while minimized, the Icon changes state to the Maximize mode [+]. The Maximize Icon causes the full list to be displayed and the Icon to return to the Minimize state [−]. In a similar fashion, the subscriber can delete 9335 an entire conversation at any time. The Email Icon 9333 allows users to forward a link to authorized subscribers and guests to allow them to examine and modify the appropriate conversation records. Lastly, an Icon 9334 is provided to allow the user to request that the entire conversation be transcribed. This Icon is greyed out when the conversation has already been transcribed.

Contributors and annotators can specify titles and explicit search terms for forums, folders, and conversations to facilitate navigating the CES knowledge base 850. Conversations are required to be filed under specific titles in hierarchically organized topic folders—something they are already accustomed to from digital documents, email messages, and on-line forums. For scheduled conferences, this is a natural part of scheduling the conference. For unscheduled conferences, the initiator is requested to provide the title and a list of search terms while the system is connecting to the other parties when the initiator would otherwise be idle. Additionally, the title and explicit search terms can also be modified during and/or after the conference by anyone with administer privilege. The CES 1000 suggests default values based on the identities and locations of the participants and the time of the conversations, augmented with information stored in the participants' profiles and contacts lists.

Review the Details of a Particular Previous Conversation

Figure 10:
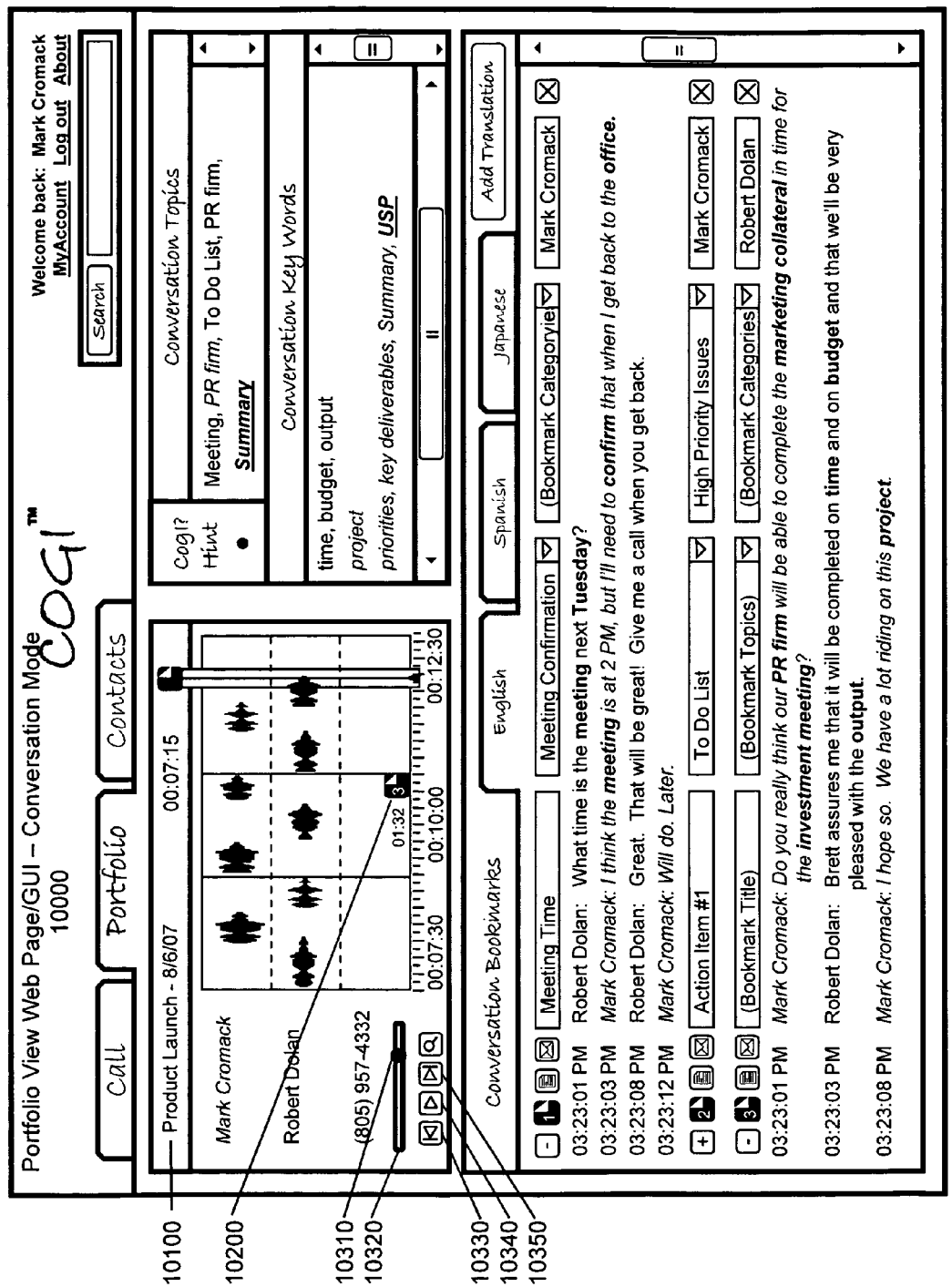
FIG. 10 illustrates an example GUI—conversation Portfolio view in Conversation details mode.

By playing out a single entry 9332 from the conversation list as described above, causes the selected conversation 10100 audio and metadata lists of CogI, Key Words and Topics to be displayed in the similar manner as during live call handling (see FIG. 10). In addition, a display representing the recorded audio stream 10320 is provided with controls to allow playing/pausing 10340, skip forward 10350, skip backward 10330, and scrubbing by dragging the audio edit point or play head 10310. Additionally, bookmarked CogI 10200 are depicted on the audio timeline display. All five of these displays are locked in time synchrony. Consequently, the conversation can be navigated by selecting individual bookmarks, keywords, and/or topics in addition to advancing any of the five associated cursors.

Annotate the Critical Portions of Conversations by Adding Comments to the Bookmarked CogI Display Pane at any Time.

Figure 11:
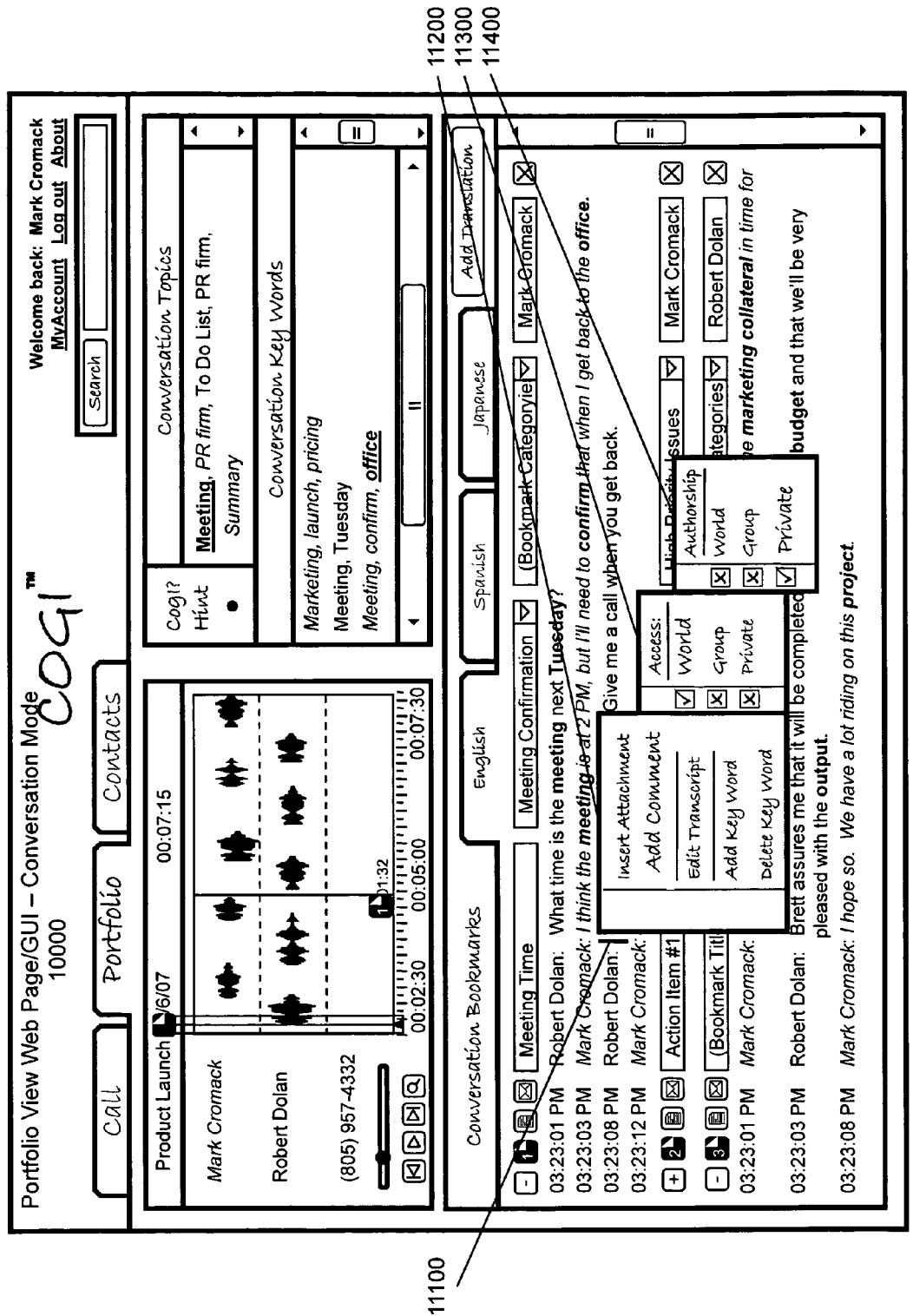

(see FIG. 11). The observer positions the cursor at the desired text insertion point 11100, invokes the Add Comment menu function using the right mouse button 11200, selects the appropriate access privileges 11300 and authorship visibility 11400, and then enters their textual note. The comment entry is distinguished in the CogI display by using brackets as delimiters (see FIG. 12—item 12100). Comments can be associated with (i.e. follow directly behind) other comments and/or transcripts of the original conversation.

Access privileges are enforced to assure that only authorized users are reading and writing appropriate conversational elements. Additionally, users can designate that their comments be accessible to the general public (world privilege), to a select few (group privilege), or remain private (can be accessed only by themselves). Authorship anonymity is preserved by allowing the comment creator to specify who is allowed to know that they are the author of the comment. One or more users are authorized to serve as the administrator for each conversation. Only administrators can examine and modify the global access privileges for the entire conversation.

Bind Hand Written Notes and Hard Copy Items to the Relevant Critical Portions of Conversations by Attaching Scanned Files to the Bookmarked CogIs During and after the Conversation.

Figure 13:
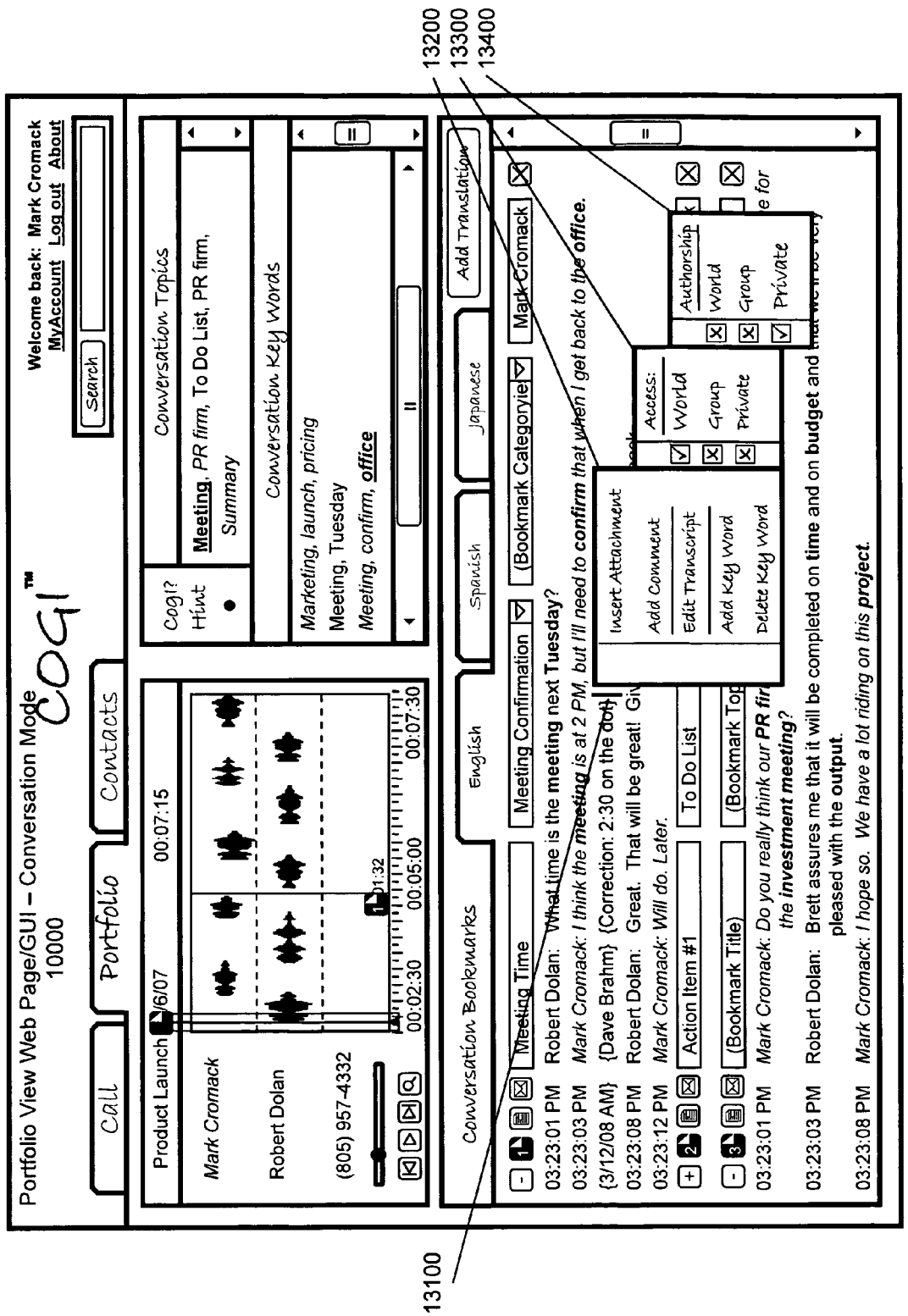
FIGS. 13 & 14 demonstrate an example of how files are attached to bookmarked transcripts.
Figure 14:
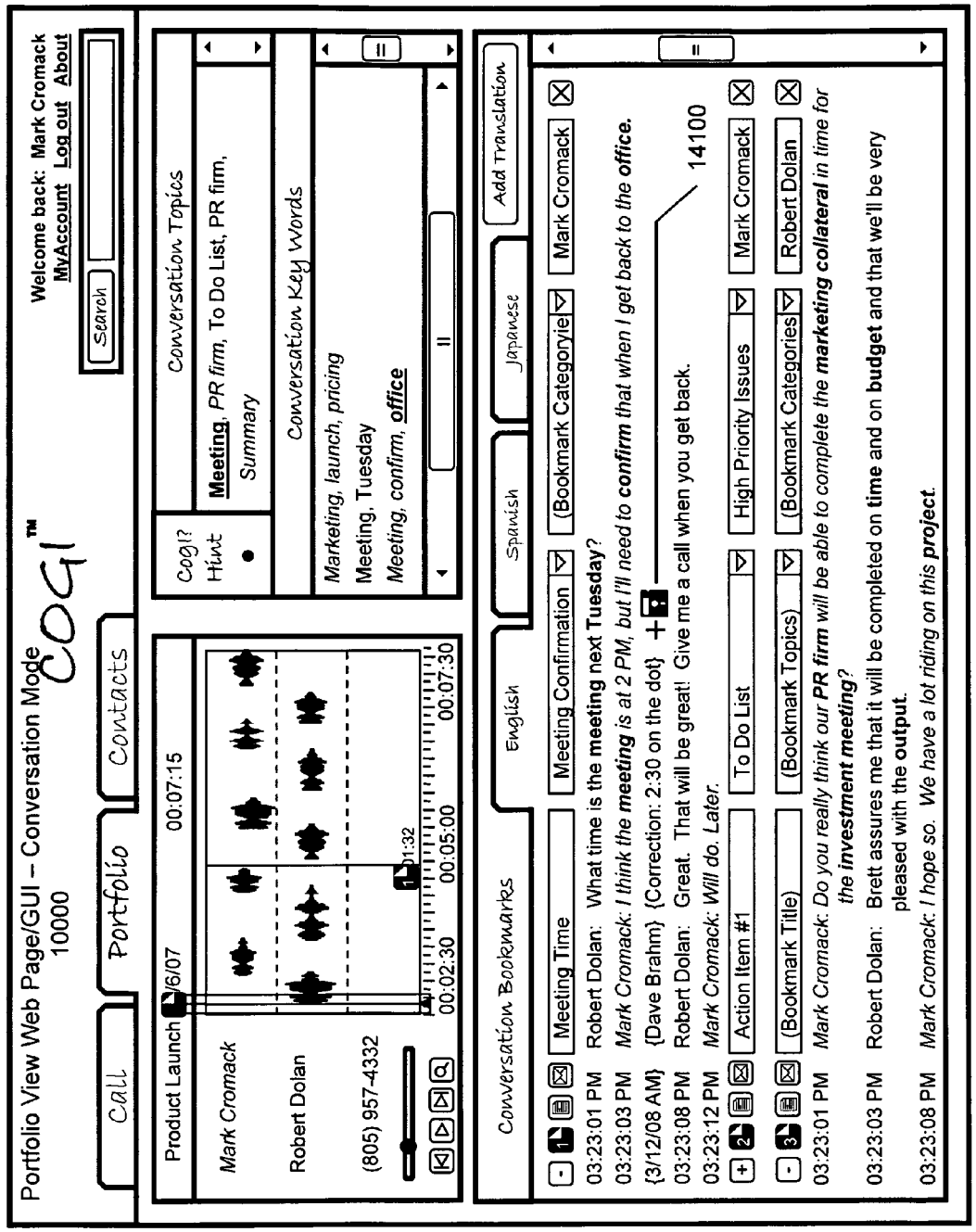

(see FIG. 13). The annotator positions the cursor at the desired text insertion point 13100, invokes the Insert Attachment menu function using the right mouse button 13200, selects the appropriate access privileges 13300 and authorship visibility 13400, and then enters or browses to the name of the file to be attached. The file attachment is distinguished in the CogI display by using a plus sign and a file Icon (see FIG. 14—item 14100). Spoken comments are also supported by attaching audio or video files. The CES 1000 provides services to transform the attached files into textual comments upon request from the annotator, including OCR and handwriting recognition in addition to voice transcription. The renderings inherit the access and authorship privileges established at the time the file attachment was created.

Personalize Key Word Spotting by Training the System to Recognize Only Key Phrases that the Subscriber Views as Significant.

Figure 15:
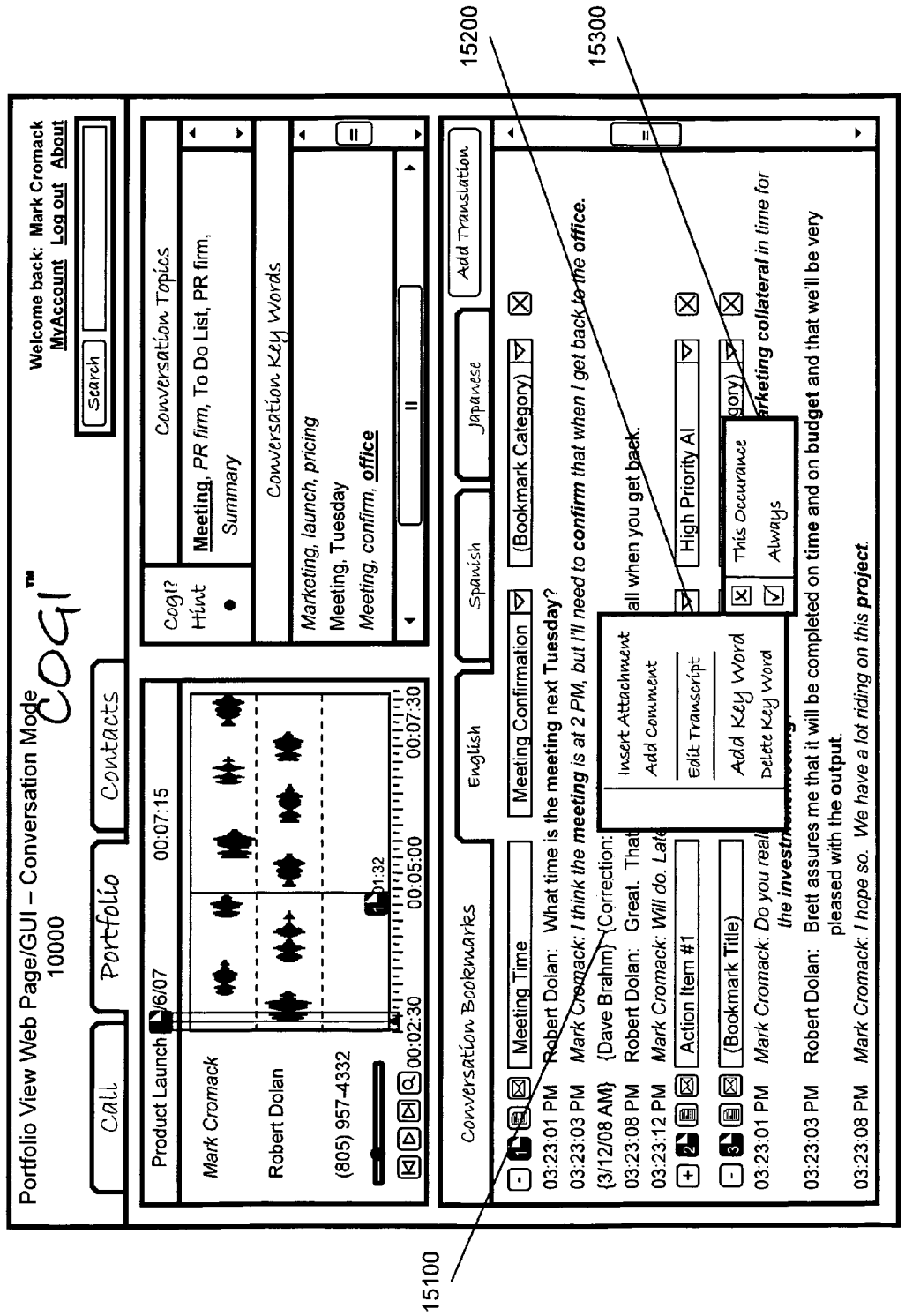
FIGS. 15 & 16 demonstrate an example of how new topics are added to the Conversation Topics list and to the subscriber's Significant Word Lexicon.
Figure 16:
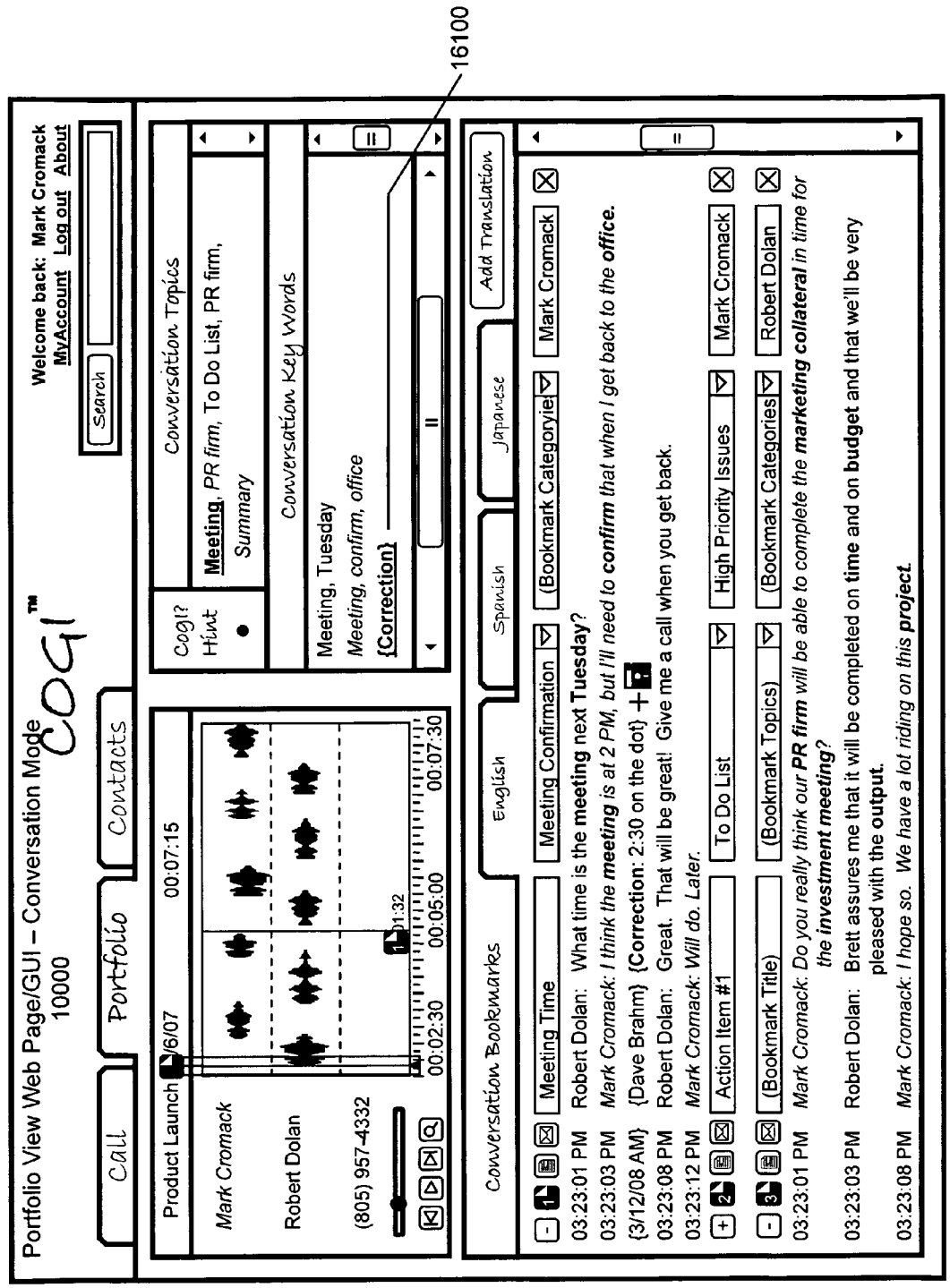

FIGS. 15 and 16 depict the user interface to add a word to the key word list in the current conversation and optionally, to enroll that word permanently into the subscriber's personal key word lexicon for future conversations. An analogous process is used to delete key words from individual conversations and from the lexicon. Users can create several different lexicons to reflect the different roles that they are responsible for and receive correspondingly different perspectives on the recorded conversations. For example, small business owners could use different views to analyze conversations from a sales and marketing perspective versus an operations and customer care perspective versus a finance perspective.

Figure 17:
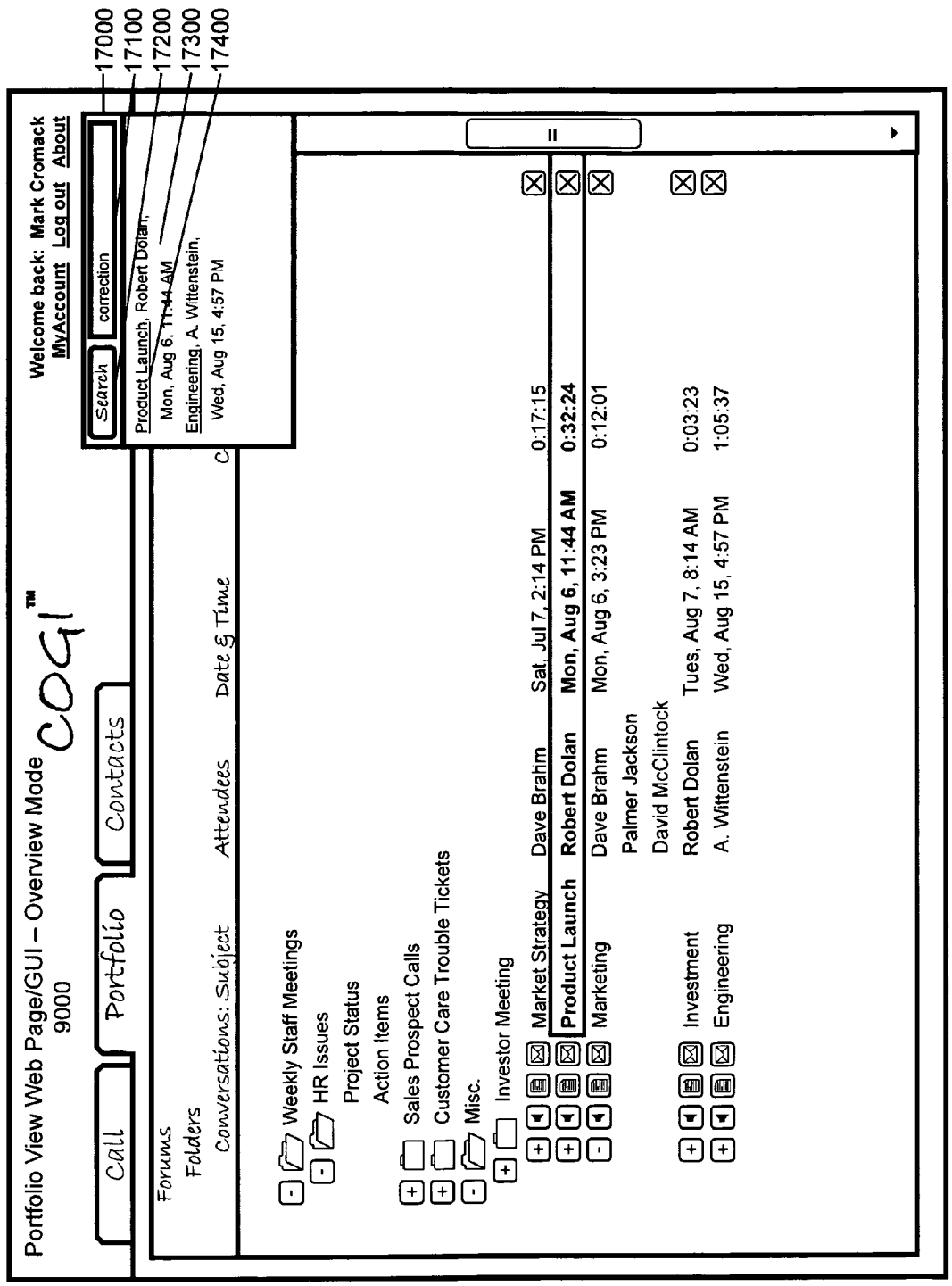
FIGS. 17 and 18 show how conversations can be navigated using a search facility.
Figure 18:
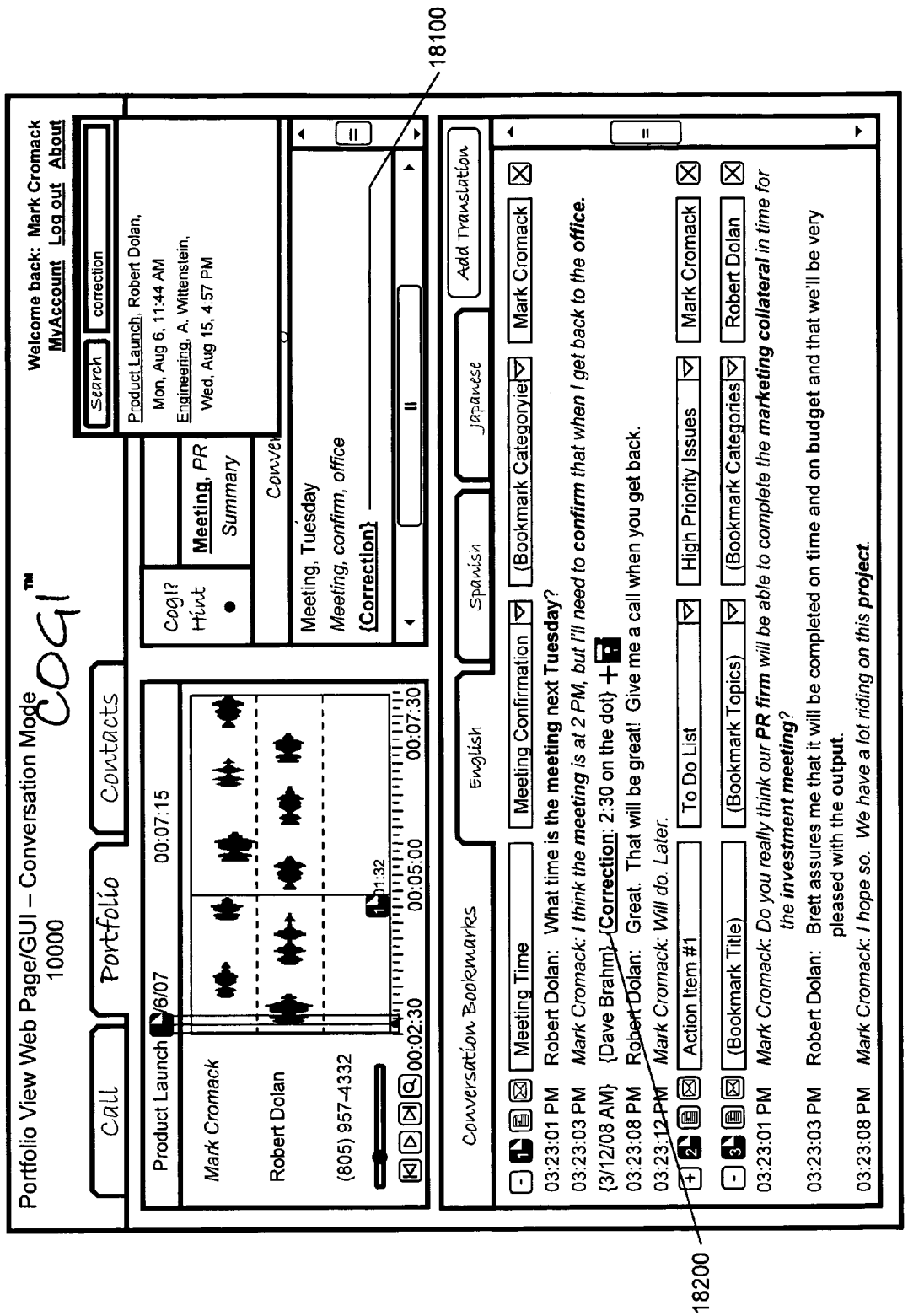

Find Conversations that Share Common Attributes (see FIG. 17—item 17000). The ability to search through conversation metadata (including titles, authors, and date/time stamps), bookmarked CogI metadata and transcription/comment text, and topics and/or key words is supported. This includes searchable "authorship" of CogI bookmarks and added keywords and topics. The identified conversations are enumerated in the search list 17300 in a drop down window and can be individually selected simply by clicking on a single item 17400. This causes the display to change to the conversation mode (see FIG. 18) with the associated items 18100 and 18200 matching the search terms in the four display panes to become high-lighted. Searching algorithms adhere to the access privilege schemes previously described.

Perform Identical functions on face-to-face (non-telephony) conversations either by recording the conversation on a PC in the meeting room or by separately recording the event using a commercial recording device and uploading the audio and/or video file into the service knowledge base 850. The capability provided includes means for the subscriber to manually enter fields like the date & time stamp of the recording when the information is not automatically provided. In addition, the service detects individual conversation participants (by scanning the audio stream using digital signal processing algorithms) as Speaker #1, Speaker #2, etc. The subscriber can subsequently optionally change these fields by manually entering different names or by selecting entries from their contacts list. Upon completion of this process, conversation record management is identical to that employed for all completed phone conversations recorded in their Portfolio. Recording consent is assumed in this situation and the entire conversation is logged. In this case the service is not responsible for system consent checking.

Examine and Modify Entries in the Subscriber's Contacts List (see FIG. 19—Contacts View Web Page/GUI 190000). Each entry includes at a minimum, the contact's name and at least one contact number. Also included is status indicating whether the individual requires explicit consent for conversation recording. If consent is Required, then additionally, the system logs the response to the question Always Granted? posed to called parties at the start of each call. Edit functionality is provided to allow entries to be added, deleted and modified. The service can be configured to detect that a call participant's contact information is not in the contact list and query the subscriber to determine if the system should add it. The Subscriber can Terminate the Service Session at any Time by Clicking his Hang Up Button.

(see FIG. 5—item 5230). If an active call is in progress, the subscriber is queried to determine if the call should be aborted or allowed to continue to completion without the subscriber's continued participation. If the call is to continue, the subscriber's phone connection is dropped and the GUI returns to the Place A Call mode (see FIG. 3-*Call* Placement Web Page/GUI 3000). If the entire call is to be aborted, the subscriber requests that all call connections be dropped, in which case the conversation records are completed as appropriate, and once again the GUI returns to the Place A Call mode (Web Page/GUI 3000).

Separate Conversations (i.e. with Different Time & Date Stamps) can be Merged Together to Form a Single Logically Threaded Conversation.

This is especially useful to reconnect unintentionally dropped calls (for example due to mobile phone network problems). It is also helpful to examine separate conversations all dealing with a single topic in a common view: for example, repeated calls with different customer service agents over time all working on the same customer's problem. Different subscribers participating in the same conversations can employ separate views of them—some using individual conversations and others with a single threaded entry.

Returning to the occurrence of unintentionally disconnected calls, the CES 1000 allows the still connected speaker to complete a thought and store it in the conversation record in the knowledge base 850 for future playback. In an analogous fashion, custom software in a smart phone 100 allows the network disconnected call participant to complete their thoughts which are buffered internally in the phone until the phone can reconnect through the network 300 to the CES 1000. Upon reconnection, the message is uploaded to the CES and the conversation record updated. If and when the two callers reconnect and merge the conversations, the participants can begin the second call by listening to the recordings from the end of the first call.

As another enhancement, the telephone can be programmed so that when telephone service is unavailable at the calling party's end, for example when a cell phone is out of a service area or a telephone exchange is overwhelmed with calls during a regional emergency such as a natural disaster, the software running on the caller's smart telephone 100 can accept and store communications and automatically forwarded them when service is restored. Likewise, when service is unavailable at the called party's end, the CES 1000 can automatically buffer up the communications and forward them once service is restored at the called party's end.

For security, off-the-shelf encryption methods are used to protect sensitive stored data against unauthorized access. For reliability, redundant distributed storage is used to protect against data loss.

What is claimed is:

1. A computer programs executing from non-transitory media, for facilitating the highlighting of conversations comprising:
   digitizing and recording the conversations;
   storing the conversations and user identified conversation segments for later review;
   transcribing the user identified conversation segments, of the recorded conversations into text;
   storing the transcribed conversation segments and identification data, in association with the conversations;
   searching for previously recorded conversations based on key words or phrases in the titles, participants, notes, bookmarks, dates, times of the conversations as well as the segments of transcribed text associated with those conversations; and,
   providing resultant conversations with common attributes for user review by enumerating conversations based on the results of key word searches.

2. The programs of claim 1 wherein portions of the conversation are selectively not recorded to address privacy and legality requirements.

3. The programs of claim 1 further comprising playing back earlier identified segments of the conversation to at least one user while the conversation is still in progress.

4. The programs of claim 1 wherein at least one of monitoring and identifying participants in the live conversation interact via a web browser or computer software client application.

5. The programs of claim 1 further comprising forwarding and sharing access to previously recorded conversations with other participants and guests.

* * * * *